US007734690B2

(12) United States Patent
Moromisato et al.

(10) Patent No.: US 7,734,690 B2
(45) Date of Patent: Jun. 8, 2010

(54) METHOD AND APPARATUS FOR PROVIDING ATTRIBUTES OF A COLLABORATION SYSTEM IN AN OPERATING SYSTEM FOLDER-BASED FILE SYSTEM

(75) Inventors: George P. Moromisato, Cambridge, MA (US); Gregory S. Klabish, Malden, MA (US); Jerry J. Shekhel, Swampscott, MA (US); Pamela J. Taylor-Paris, Upton, MA (US); Mark R. Szamrej, Westford, MA (US); Raymond E. Ozzie, Manchester, MA (US); Eric M. Patey, Rockport, MA (US); Patrick M. Halvorsen, Andover, MA (US)

(73) Assignee: Microsoft Corporation, Redmond, WA (US)

( * ) Notice: Subject to any disclaimer, the term of this patent is extended or adjusted under 35 U.S.C. 154(b) by 1507 days.

(21) Appl. No.: 10/656,904

(22) Filed: Sep. 5, 2003

(65) Prior Publication Data

US 2009/0138808 A1    May 28, 2009

(51) Int. Cl.
*G06F 15/16* (2006.01)
*G06F 3/00* (2006.01)
(52) U.S. Cl. .................. 709/204; 709/205; 715/751; 715/752; 715/753
(58) Field of Classification Search .............. 709/204, 709/205; 715/751–753; 707/203
See application file for complete search history.

(56) References Cited

U.S. PATENT DOCUMENTS 5,564,037 A * 10/1996 Lam ........................... 711/161

| | | | |
|---|---|---|---|
| 5,897,640 A | 4/1999 | Veghte et al. | |
| 5,995,098 A * | 11/1999 | Okada et al. | 715/752 |
| 6,182,121 B1 | 1/2001 | Wlaschin | |
| 6,324,544 B1 | 11/2001 | Alam et al. | |
| 6,356,961 B1 * | 3/2002 | Oprescu-Surcobe | 710/20 |
| 6,549,916 B1 | 4/2003 | Sedlar | |
| 6,557,028 B2 | 4/2003 | Cragun | |
| 6,574,617 B1 | 6/2003 | Immerman et al. | |
| 6,594,664 B1 | 7/2003 | Estrada et al. | |
| 6,640,241 B1 * | 10/2003 | Ozzie et al. | 709/204 |

(Continued)

FOREIGN PATENT DOCUMENTS

EP    1517260 A2 *   3/2005

OTHER PUBLICATIONS

"BadBlue Word Sharing." BadBlue. 2002. Working Resources Enterprises. Dec. 19, 2007 <http://badblue.com/helpdoc.html>.*

(Continued)

*Primary Examiner*—Philip J Chea
(74) *Attorney, Agent, or Firm*—Wolf, Greenfield & Sacks, P.C.

(57) ABSTRACT

A conventional operating system folder or directory based file system is implemented with, or enhanced to provide, attributes of shared collaborative workspaces. In particular, the conventional file system is connected to either a server based or a distributed collaboration system and the user interface of the operating system file system is augmented to allow it to control aspects of the collaboration system. Each folder or directory can be synchronized and treated as a "workspace" that can be viewed and shared with other users or groups of users. Folder can also be provided with "awareness" information that indicates collaborators that are present and those that are sharing the workspace.

53 Claims, 15 Drawing Sheets

U.S. PATENT DOCUMENTS

| | | | | |
|---|---|---|---|---|
| 6,996,780 | B2* | 2/2006 | Estrada | 715/751 |
| 7,080,124 | B1* | 7/2006 | Shankar | 709/206 |
| 7,149,959 | B1* | 12/2006 | Jones et al. | 715/500.1 |
| 2002/0035591 | A1* | 3/2002 | Kimura | 709/200 |
| 2003/0145093 | A1* | 7/2003 | Oren et al. | 709/229 |
| 2003/0167281 | A1 | 9/2003 | Cohen | |
| 2004/0088382 | A1* | 5/2004 | Therrien et al. | 709/219 |
| 2005/0210392 | A1* | 9/2005 | Koide et al. | 715/751 |

OTHER PUBLICATIONS

Levine, Joe. "Ten Minute Guide to Groove 2.0". Que. Jun. 20, 2002.*

Groove Networks, Inc., "Desktop Collaboration, Product Backgrounder," WWW.D21.CO.UK, [online] Jan. 2003, pp. 1-17, URL: http://www.d2i.co.uk/Papers/backgrounderproduct.pdf.

Dana Dolan, "Groove Workspace 2.5 Detailed Evaluation Paper," WWW.TELEWORKCONSORTIUM.ORG, May 2003, pp. 1-11.

Groove Networks, Inc., "Groove Web Services—Extending Groove Desktop Collaboration," WWW.GROVE.NET, [online] Nov. 2002, pp. 1-8 URL: www.groove.net/pdf/wpgroove_web_services.pdf.

Ramsey, Norman, "An Algebraic Approach to File Synchronization", Foundations of Software Engineering 2001, Division of Engineering and Applied Sciences, Harvard University, Cambridge, MA, pp. 175-185.

Balasubramaniam, S., "What is a File Synchronizer?", CSCI Technical Report #507, Indiana University, Apr. 22, 1998, pp. 1-21.

* cited by examiner

METHOD AND APPARATUS FOR PROVIDING ATTRIBUTES OF A COLLABORATION SYSTEM IN AN OPERATING SYSTEM FOLDER-BASED FILE SYSTEM

FIELD OF THE INVENTION

This invention relates to collaboration systems and to folder-based file systems that are part of conventional operating systems and to methods and apparatus for providing attributes of a collaboration system in a folder-based file system.

BACKGROUND OF THE INVENTION

Collaboration involves the ability for each member in a group of members, called "collaborators" to automatically transmit information to, and receive information from, other collaborators in the group. In order to facilitate such collaboration, various systems have been developed that allow such information to be transmitted between personal computer systems, communication appliances or other communication devices, including handheld and wireless devices. Collectively, these devices will be referred to a "computers" in this description.

Computer-based collaboration may occur locally among users connected to, or operating with, one computer or server. Alternatively, collaboration may occur over a network, such as the Internet, wherein each of the users is located at a computer connected to the network. A server may also be connected to the network. Several collaboration models are currently being implemented as networked computer collaboration systems. One of these models is a client-server model in which all collaborators are connected, via the network, to a central server. Information generated by each collaborator is sent over the network to the server that then transmits the information back over the network to each other collaborator. In one version of this system data that is being collaboratively modified may be stored centrally on the server. Then, each collaborator that wants to modify the data sends information to the server to effect a change in the server data. The server modifies its copy of the data and then sends information, synchronously or asynchronously, representing a "view" of the modified data to all collaborators, so that each collaborator can display the data locally.

Alternatively, in a server based system, in addition to the data copy maintained in the server, additional local data copies may be maintained in each collaborating computer. Each collaborator that wants to modify the data sends information to the server to effect a change in the server data. The server modifies its copy of the data and then transmits the command to all collaborators. Each collaborator uses the command to update its local data copy. This local data copy is then displayed locally. Examples of this model are Lotus Notes® sold by International Business Machines, Inc. Armonk, N.Y. and Exchange sold by Microsoft Corporation, Redmond, Wash.

Another collaboration model is a "peer-to-peer" or "distributed" model in which direct connections are established over the network between each of the collaborating computers. Information generated by each collaborator is then sent directly to each other collaborator. In such a system, the collaborators communicate in a private "virtual" shared space that is generated and maintained by the collaborative system.

A central data repository is not necessarily in a peer-to-peer collaboration system because each collaborator has a local copy of the data being collaboratively modified. In order to change the data, either a "push" or a "pull" model may be employed. In a "push" model, a collaborator generates a data change request that is forwarded to each other collaborator. The incoming data change requests are then used by each collaborator to modify its local data copy. In a "pull" model, one collaborator modifies local data and offers up such changes upon asynchronous request. Other collaborators issue requests, fetch and gather changes, and subsequently modify their local data copies to reflect such changes. Examples of this peer-to-peer model are the Kubi Client, developed and marketed by Kubi Software of Lincoln, Mass., and the Groove Workspace collaboration system developed and marketed by Groove Networks, Inc., 100 Cummings Center Suite 535Q, Beverly, Mass. 019015 that is described in detail at Groove Networks' web site. See also U.S. Pat. No. 6,446,113 B1.

However, all of these latter collaboration systems are application programs that run in conjunction with an operating system that is present on all conventional computer systems. Because the collaboration systems are purely application programs (such as an electronic mail application or a groupware application or a browser-based application), they have the disadvantage that they require each collaborator to learn a user interface that is peculiar to the particular program. Many users are reluctant to learn the new controls and functions that are associated with such interfaces.

Modern operating systems include a file system that is typically organized by folders or directories. These folders or directories are either explicit user-specified collections of files, or may be "virtual" collections in which files are organized based upon a query or search criteria. This file system and associated foldering or directory system (hereinafter referred to as a "folder-based" file system) has the advantage that it is perceived by the user to be part of the operating system. Therefore, if a user has the operating system he or she is already familiar with the built-in file system so that the users do not need to learn an additional set of commands and functions to operate the system.

Such a folder based file system is shown in FIG. 1, which is a screen shot of a file system display 100 from the Windows® XP Pro operating system sold by Microsoft Corporation, Redmond, Wash. This display shows various folders 102 that may contain files or additional subfolders. The display also includes a task pane 104 that presents the user with various tasks 106 that can be performed on the folders 102. These tasks include renaming the folder, moving the folder, copying the folder etc. In addition, another section 110 permits the user to navigate to other areas in the computer such as the local disk, the "My Documents" folder and other selected places. A further section 112 provides details, such as the date that the file was last modified, about the selected folder (Folder D is shown selected in FIG. 1).

However, because collaboration systems are separate application programs, in order to perform collaborative work on files that are part of the folder based file systems, the files must be moved or copied between the conventional operating system file system and the collaboration application program. Typically, such moving or copying of files between the conventional file system directories and the collaboration system can be tedious and error-prone. Furthermore, the duplication of such information can result in excessive use of storage, and may cause user confusion as multiple copies may get out of synchronization with one another as they are modified.

It would be convenient if the files could be shared collaboratively without having to move them from the file system into the collaborative system. To this end, in many folder-based file systems, the folders or directories can be shared with other parties by treating the folders as "remote folders" or "remote mounted volumes." For example, in FIG. 1, folders can be shared by selecting a folder, such as Folder D, and then selecting the "Share this folder" task 108 from task pane section 106. A selection of the share task opens a dialog box of which a screen shot 200 is shown in FIG. 2. This dialog box allows various sharing parameters to be set. For example, radio buttons 202 can be used to select whether the folder should be shared. Text boxes 204 and 206 permit the user to enter a folder sharing name and comment. Radio buttons 208 allow the user to control the number of other users allowed to share the selected folder. Finally, additional buttons 210 and 212 allow the user to set sharing permissions and to set parameters that allow the selected folder to be accessed even when a user is not connected to the network. When a selected folder is designated as shared, a "hand" overlay is applied to the icon that represents the folder as shown at 114 in FIG. 1.

Treating the folders in this manner allows sharing of the data in the folders, but users cannot easily coordinate their activities and usage of the data and thus cannot effectively "collaborate" in a manner similar to that provided by the aforementioned collaboration systems. For example, folder sharing does not provide any indication of, or identify, a user that made a change to the folder or file (nor does it notify others when a change has been made). In addition, file sharing systems do not provide any mechanism that indicates who is currently accessing a folder or who is examining files in that folder. Further, file sharing does not allow users to store comments about the files; instead, all communication between collaborators must be done through files. In contrast, collaboration systems provide mechanisms for the collaborators to communicate "out-of-band", yet still "in context". Effectively, collaboration systems allow the collaborators to not only modify the shared files, but also to communicate regarding the files within the surrounding context of the folder containing the files themselves.

SUMMARY OF THE INVENTION

In accordance with the principles of the invention, a conventional operating system folder or directory based file system includes, or is enhanced to provide, attributes of shared collaborative workspaces. In particular, the conventional file system is connected to either a server based or a distributed collaboration system and the user interface of the operating system file system is designed, enhanced or otherwise augmented to allow it to control aspects of the collaboration system. Each folder or directory may be treated as a "workspace" that can be viewed and shared with other users or groups of users and each folder is provided with "awareness" information that indicates collaborators that are present and those that are sharing the workspace.

In one embodiment, an invitation mechanism permits a user in a workspace to invite another user or computer to join the workspace. The invitation mechanism may also permit a person who is accepting an invitation to choose the location of the new workspace on his or her computer, or to merge the workspace with an existing folder on his or her computer.

In another embodiment, different users may be granted specific permissions to perform operations, such as add, update, delete, etc.

In still another embodiment, the display of the operating system folder may be augmented with an area that displays meta-information about the shared folder or workspace. Such meta-information may include a log of modifications (for example, the user that made changes and the date when changes were made) and attributes of the workspace (for example, the name of the workspace, the last synchronization time, the last time a collaborator was online, etc.)

In yet another embodiment, a "chat" or real-time conversation mechanism is provided so that members can communicate instantly.

Another embodiment may have an awareness mechanism that indicates whether members are online and available. The awareness mechanism may also display whether other members currently have a folder open in a window. The awareness mechanism can further indicate whether other members are actively working on any of the files in the folder.

Still another embodiment may have a notification mechanism that alerts members when monitored objects change. Such a notification mechanism can alert the user by means of an alert mechanism such as an operating system task bar or side bar or another mechanism such as an audio alert, email alert or instant message alert.

Another embodiment may have a commenting mechanism that allows members to leave persistent comments about the files.

Still other embodiments can have a check-in/check-out mechanism so that a member can reserve a file to prevent or discourage other members from modifying the file. Such a system may also have a versioning mechanism that allows multiple update conflicts to be handled and a "read/unread and modified/unmodified" mechanism that indicates whether a file has been read or modified.

In yet another embodiment, "asymmetric file service" is provided in distributed collaboration systems in which copies of the files are stored locally. Asymmetric file service is a mechanism by which collaborators can choose to locally store only the files of interest to them. In particular, in a distributed collaboration system, in which all users keep local copies of the collaboration data, it is often useful to subset the collaboration data. For example, if users collaborate on a library of 1,000 files in a distributed collaboration system, it might be wasteful or otherwise unnecessary for all collaborators to have their own local copy of each file. Instead, each collaborator may choose to have a copy of only the files of interest to them. At any point, another collaborator may then request a copy of a file that they do not yet have. The collaboration system will then fetch the file from any appropriate other collaborator who has a copy of the file.

BRIEF DESCRIPTION OF THE DRAWINGS

The above and further advantages of the invention may be better understood by referring to the following description in conjunction with the accompanying drawings in which.

DETAILED DESCRIPTION

Figure 3:
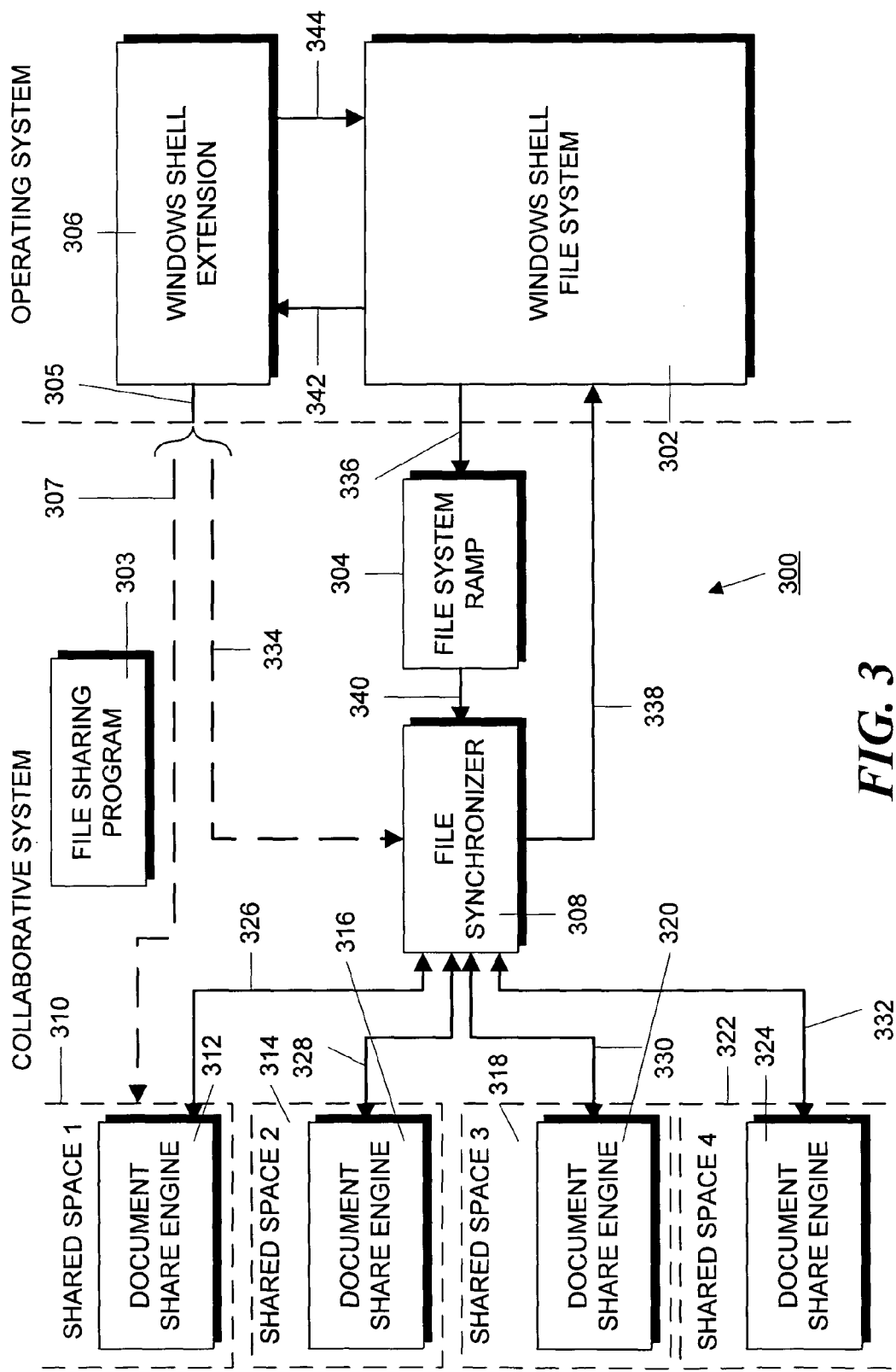
FIG. 3 is a block schematic diagram showing the overall architecture of the conventional file system connected to a collaboration system and extended in accordance with the principles of the invention.

The overall architecture of the inventive system 300 is shown in FIG. 3. For the purposes of illustration in the discussion below, an operating system (hereinafter generically referred to as "OS") that can be used with the invention is the aforementioned Windows XP Pro operating system and a collaborative system that can be used with the present invention is the aforementioned Groove Workspace collaborative system. However, those skilled in the art would realize that other operating systems can be modified in the manner discussed below to achieve the results provided by the invention and that other collaborative systems could also be used with the invention. Further, although the discussion centers below on modifications to an existing operating system, it would be apparent to those skilled in the art that a new operating system could be designed that included the features of the invention in a straightforward manner. This new operating system could include not only user interfaces designed to offer collaborative services, but also the collaborative software itself so that the operating system and collaborative software function as a unified program.

Figure 1:
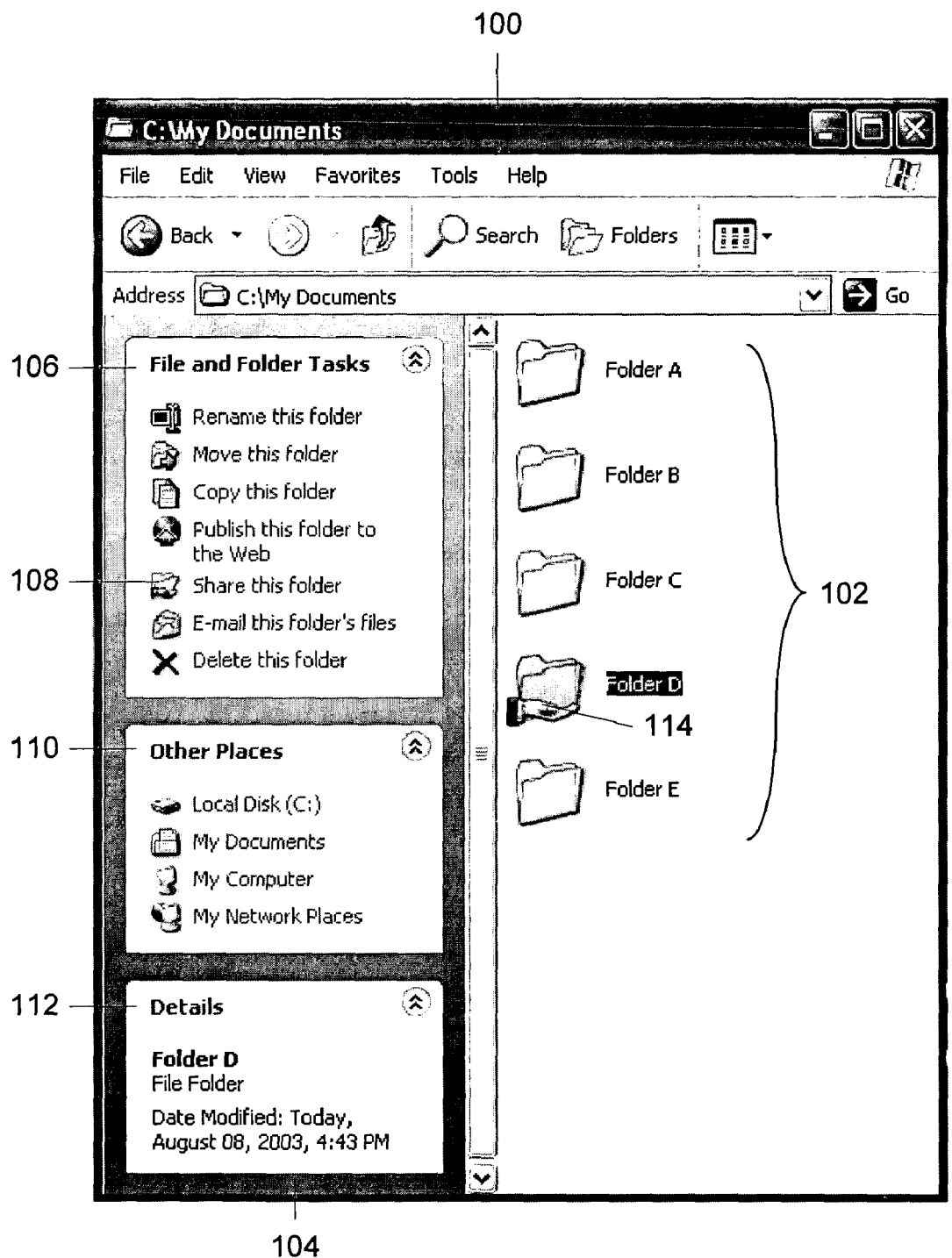
FIG. 1 is a screen shot of a screen display taken from a conventional operating system file system.
Figure 2:
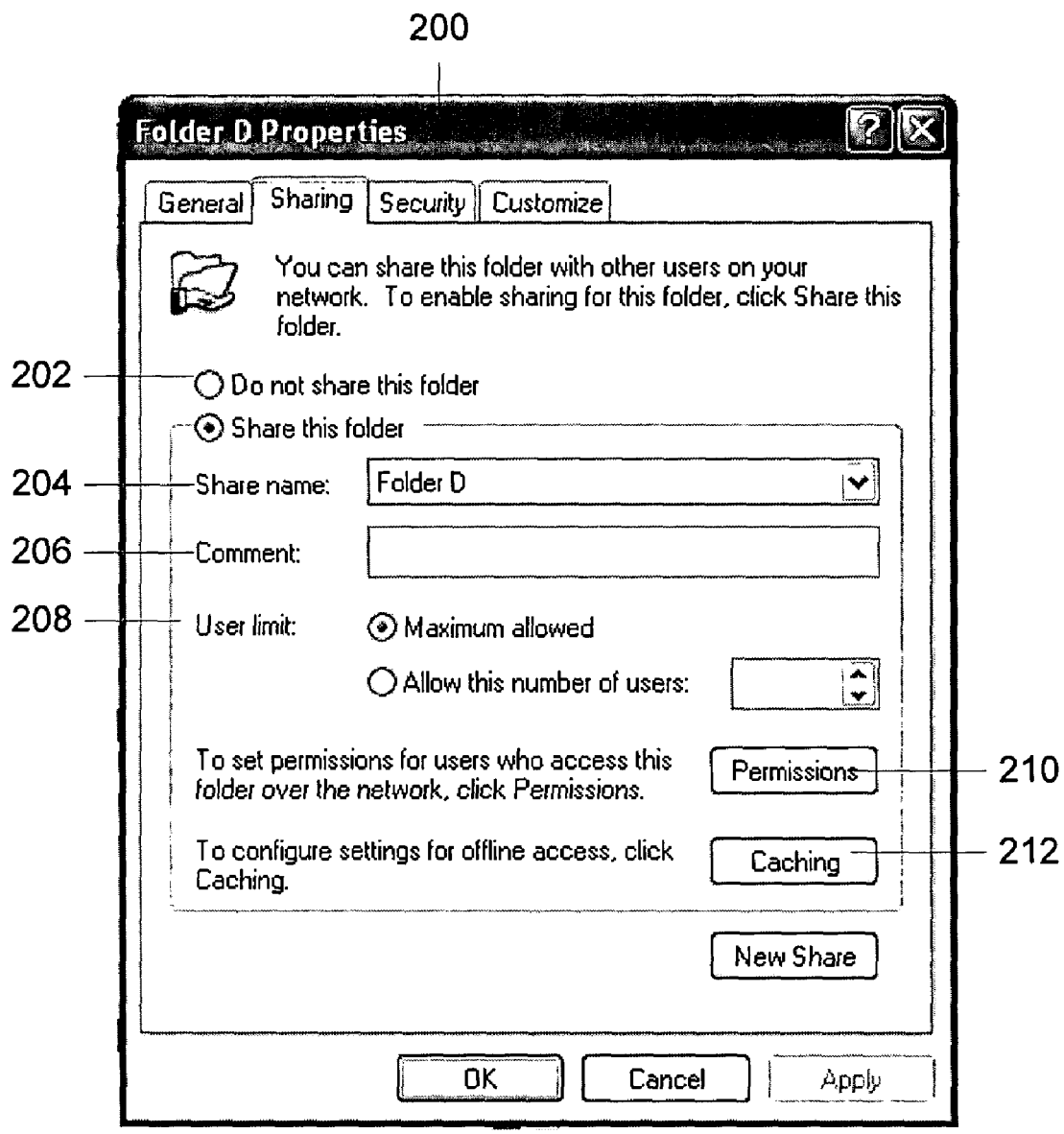
FIG. 2 is a screenshot of a dialog box that allows a user to set sharing parameters in a conventional file system.

The Windows XP Pro operating system has a built-in folder based file system as described previously with respect to FIGS. 1 and 2. As used herein, the term "folder" means either a dynamic or persistent set of objects assembled either by explicit user action or by a database-like query that selects a set of objects in response to user-specified selection statements. The term "file" as used herein means a set of persistent data with associated metadata such as name, last modification date, or custom attributes specified by a user. Finally, the term "user" as used below includes a person, a computer or an agent operating on behalf of a user. The Windows XP Pro operating system includes a "Windows shell" program that provides the operating system functionality and the operating system user interface. This shell program can be customized by a user. In particular, the Windows shell program provides the functionality and user interface for the folder-based file system, hereinafter referred to as the "OS file system."

In accordance with the principles of the invention, the Windows shell program can be extended by a Windows shell extension 306. The Windows shell extension provides the main user interface to the inventive system in a manner described below. It extends the windows shell by receiving commands from the Windows shell file system 302 and by generating commands to the Windows shell file system 302 as indicated schematically by arrows 342 and 344, respectively. It also communicates with the collaborative system, as indicated schematically by arrow 305 in a manner described below.

In general, the aforementioned Groove Workspace collaborative system is a distributed collaboration system and collaborating computers are connected to each other by a network, such as the Internet. Although various networks can be used with such a system, in the discussion below, the network is assumed to be the Internet. In this system, the collaborating computer systems constitute peer units and communications through the Internet can be directed from one peer unit to another, without intermediaries. Each peer unit can be implemented as a personal computer or other form of network-capable device, such as a set top box or hand-held device. The collaborative system is implemented on peer units by a client program called a "transceiver" that receives and processes communications from other peer units.

In the Groove Workspace collaboration system, a program called an "activity" is resident in each collaborating computer system, communication appliance or other network-capable device. The activity allows a shared, focused task, such as, for example, a "chat", gaming, or business application, to be performed in collaboration with other, remotely-located collaborators. This collaboration involves shared and mutual activities between individuals and small groups in private shared spaces. Each shared space is an instantiation of one or more activities operable on each of the collaborating computers of members of that shared space.

In the system, participants or members of a shared space access the system by opening "accounts" that are associated with "endpoints." Since an individual collaborator may access the system via more than one device, an endpoint is defined as a unique combination of an individual and a device. Each endpoint stores an individual, local copy of the shared space data.

Each activity includes one or more tools, each of which interacts with a collaborator, for example, by receiving mouse and keyboard events, and initiates data change requests in response to the interactions. These data change requests are used locally and sent to other members of the shared space. Each activity also includes one or more data-change engines, separate from the tools, for maintaining the local copy of the shared space data pursuant to a common data model. The data model is, for example, activity-specific, and preferably the same over all members of the shared space. Each collaborating computer also includes a dynamics manager that examines data change requests generated locally and received from other shared space members and coordinates the execution of the local and other data change requests and directs the data-change engine to make the requested changes to the local copy of data.

However, since the Windows shell file system 302 does not incorporate a collaborative system transceiver, it cannot directly interact with the collaborative program in the same manner that a user can interact by using the collaborative system user interface. In accordance with the principles of the invention, the Windows shell file system 302 and the Groove Workspace collaboration system interact by means of event notifications and the windows shell extension 306.

The file system RAMP program 304 is part of the collaborative system code and detects changes to files in the OS file system 302. It communicates with the file synchronizer 308, as shown schematically by arrow 340, in order to inform the file synchronizer 308 that it needs to synchronize those changes. In particular, the Windows XP Pro operating system provides a system event notification system to which clients can subscribe to receive notifications of selected events. These events include changes in the OS file system, such as folder and file edits, additions and deletions. In order to receive these notifications, a client must register with the notification system for events of a selected type. During the collaborative system start up, the file system RAMP program 304 is invoked so that it can register with the OS event notification system for file notifications indicating changes to files and file contents in the Windows shell file system 302.

The file synchronizer 308 is a software program that insures that any changes made to a file in the Windows shell file system 302 are also made to copies of that file that are stored in the collaborative system and vice versa. Although the file system RAMP program 304 receives a notification from the Windows shell file system 302 when a file is changed, this notification does not indicate what file was changed or what changes were made. Accordingly, the file synchronizer 308 stores in the collaborative system data store a "snapshot" of the Windows shell file system 302. This snapshot contains sufficient information to describe the state of each synchronized file at the time of the last successful synchronization. The form and contents of the snapshot depend on the operating system in use. For example, the snapshot can consist of the directory structure and a set of records (one for each file) wherein each record contains information necessary to tell whether a file has been changed since the last time the snapshot was taken, but may omit the contents of the file. This information may include the size of the file, the last date on which the file was modified, non-data "extended" file attributes and their values (such as are used in the IBM OS/2 operating system) sometimes also referred to as "metadata" in operating systems that treat files more as semi-structured database items with a flexible schema, or "non-data forks" (such as the MacOS operating system), inode information (for Unix operating systems), or a hash value computed from the file contents.

When the file synchronizer 308 is notified of a change in the Windows shell file system 302 by the file system RAMP 304, the file synchronizer 308 can then examine the snapshot information to determine what changes were made to the Windows shell file system and which file or files have been changed. The file synchronizer 308 receives input from the Windows shell extension 306 (as indicated schematically by arrow 334) and from the OS file RAMP program 304 as indicated schematically by arrow 336.

The file synchronizer 308 further interacts with a document share engine that is associated with each shared virtual space as indicated schematically by arrows 326, 328, 330 and 332. FIG. 3 illustrates four shared spaces 315, 314, 318, and 322 which are created by the collaborative system. Each of these spaces has an associated document share engine 312, 316, 320 and 324, respectively. Each document share engine stores a "file descriptor" for each file in a synchronized folder. The file descriptor consists of the file metadata (such as filename, size, and modification time) and is used to keep track of the file in the collaborative system.

During collaborative system operation, each engine also sends data change requests containing the file descriptors to each collaborator in its respective shared space in order to keep all collaborators synchronized. Each document share engine also holds the aforementioned file system snapshot that the file synchronizer needs to detect file changes. Depending on how changed files are distributed, a document share engine may also keep a copy of the contents of a synchronized file in the engine so that when the file is edited (as determined by the file synchronizer), the copy in the document share engine can be used as a point of comparison. Then only the actual changes are sent to other collaborators (via binary differential updates as discussed below) instead of the entire file contents.

A file sharing program 303 is also provided in the collaborative system. In the case of the Groove Workspace collaboration system, the file sharing program 303 may be a modified Files Tool that is part of the normal Groove Workspace system. The modified Files Tool is associated with a shared space and exposes a user interface option to enable or disable folder synchronization in the tool. Such a user interface option can be made available through either a tool menu, "Properties" dialog box button, or both, for the folder of interest. The option enables and disables folder synchronization mode in the appropriate document share engine associated with the shared space. The option can be enabled or disabled based on the inspection of (1) an identity policy that is defined for the identity that the user is currently using and (2) a tool permission for setting the synchronization mode that is defined by the document share engine. User identities, identity policies and their implementation are discussed in more detail in a co-pending U.S. patent application Ser. No. 10/631,206, entitled METHOD AND APPARATUS FOR MANAGING AND DISPLAYING CONTACT AUTHENTICATION IN A PEER-TO-PEER COLLABORATION SYSTEM, filed on Jul. 31, 2003 by Raymond E. Ozzie, George Moromisato, Nimisha Asthagiri, Wei Dai, Alexei Evdokimov, Mark Cote and Adam Weiss, which application is incorporated by reference in its entirety.

Figure 4A:
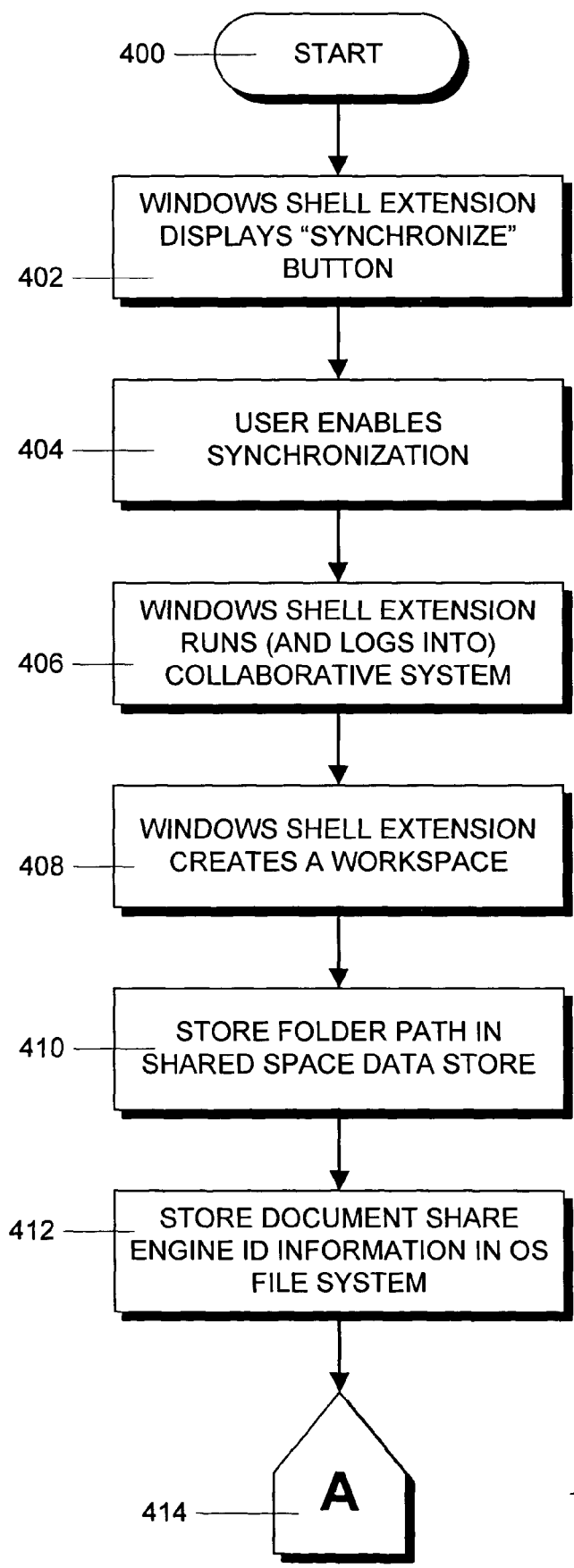
FIGS. 4A and 4B, when placed together form a flowchart showing the steps in an illustrative process for synchronizing files in an illustrative collaboration system with files in an operating folder-based file system.
Figure 4B:
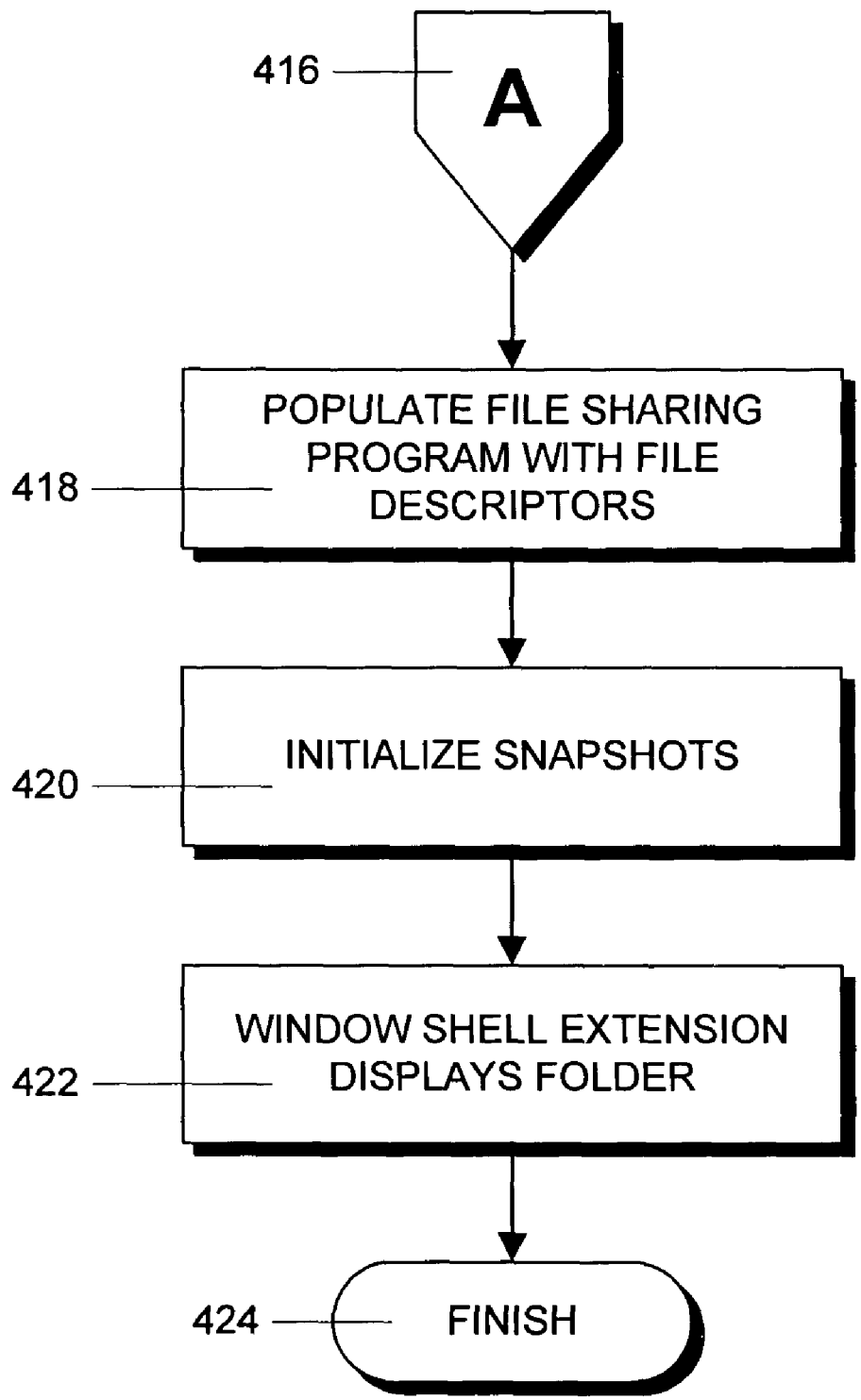

The process of synchronizing a folder in the Windows shell file system 302 with a folder in the collaborative system is illustrated by the flowchart formed when FIGS. 4A and 4B are placed together. This process starts in step 400 and proceeds to step 402 where the Windows shell extension 306 displays a "synchronize" button.

In particular, in the case of Windows XP Pro operating system, the Windows shell extension 306 can be implemented by means of a "band object" that generates an "explorer band" graphic display in the Windows shell file system user interface. Band objects and the manner of using them to extend the Windows XP Explorer user interface are described in detail at the Microsoft web site. In addition, the shell extension 306 may extend the Windows XP Explorer button bar. In the illustrative embodiment, the Windows Explorer button bar is modified to add the "synchronize" button by a band object that is created when the collaborative system is installed in the computer where the operating system is running.

Figure 5A:
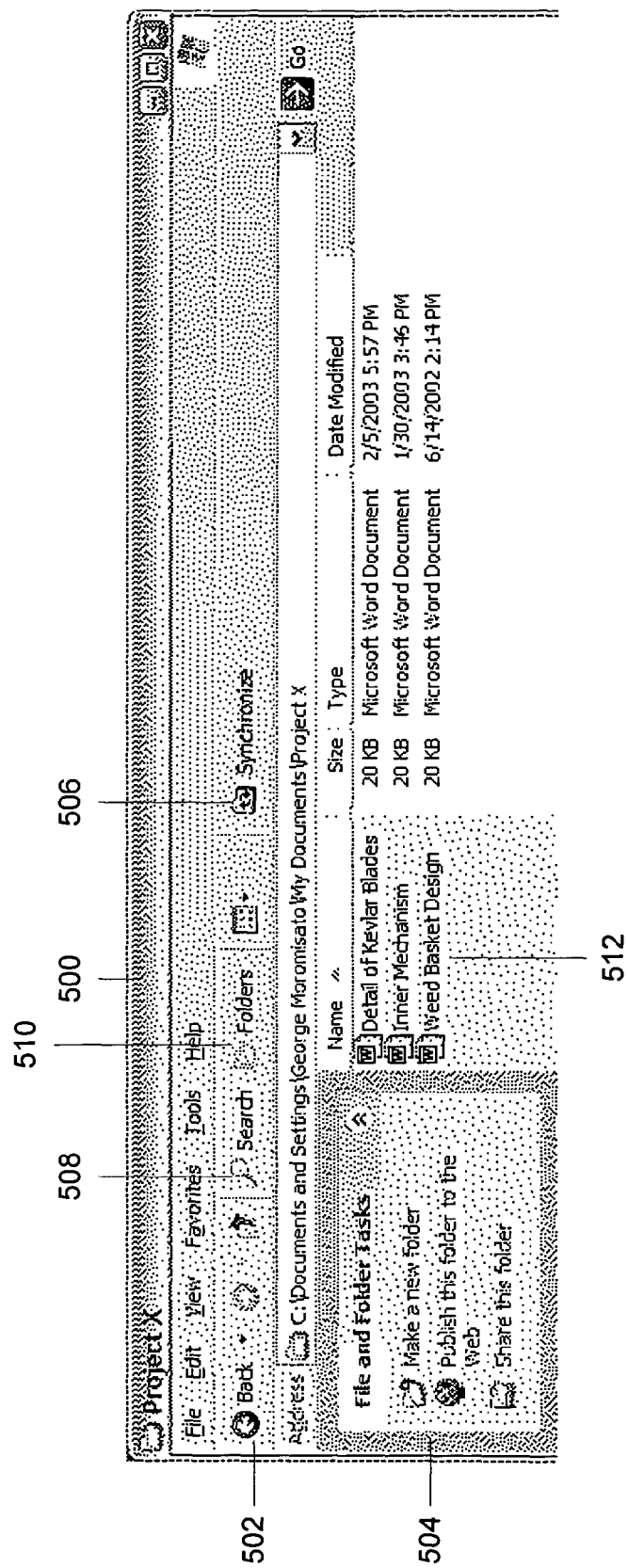
FIG. 5A is a screen shot of a screen display taken from a conventional operating system file system that has been modified in accordance with the principles of the invention to add a file synchronization button.

FIG. 5A is a portion 500 of a screen shot of the Windows Explorer screen display showing the button bar 502 and a list of folders 512 that allows a folder to be selected for synchronization. In accordance with the principles of the invention, the button bar has been modified by the Windows shell extension 306 to add an illustrative synchronize button 506.

In FIG. 5A, the user has selected a folder named "Project X", but synchronize button 506 is "off" so that the Explorer Band display shows the conventional "File and Folder Tasks" pane 504. When a user clicks on the synchronize button 506, the task pane 504 is replaced with a "synchronize pane" and the synchronize button 506 appears "pushed in". This operation follows the same user interface conventions as the search button 508 and the folders button 510 on the conventional button bar 502.

Figure 5B:
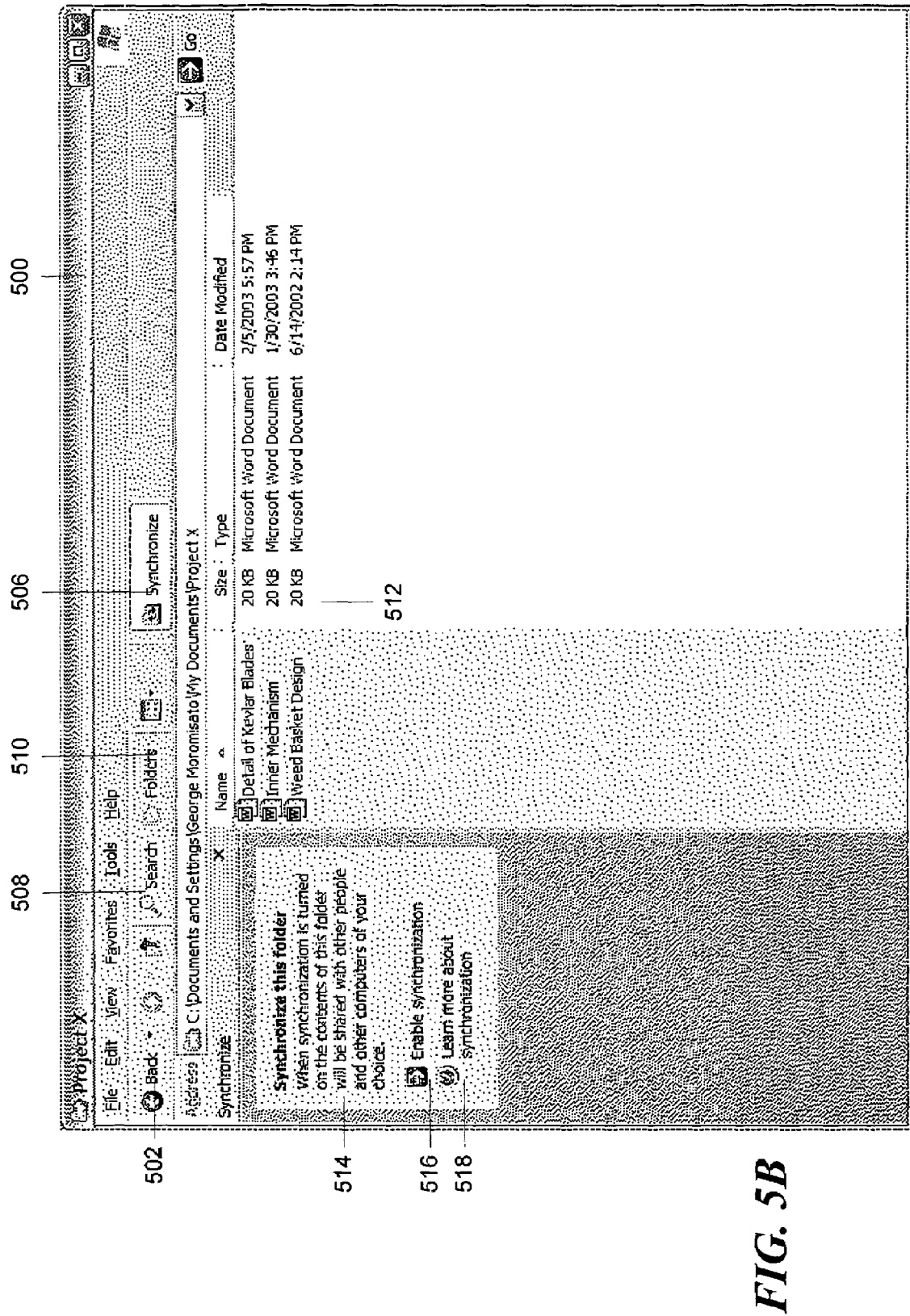
FIG. 5B is a screen shot of a screen display taken from a conventional operating system file system that has been modified in accordance with the principles of the invention to add an explorer band that includes file synchronization options.

Next, in step 404, a user uses the Window shell extension 306 to enable synchronization. FIG. 5B shows a screen shot 500 of the Windows Explorer screen display showing an illustrative synchronize pane 514 that appears when the synchronize button 506 is selected. Elements in FIG. 5B (and corresponding FIGS. 7-12) that correspond to elements in FIG. 5A have been given corresponding numeral designations. For example button bar 502 in FIG. 5A corresponds to button bar 502 in FIG. 5B. Corresponding elements in FIG. 5B that were discussed in connection with FIG. 5A will not be discussed further in connection with FIG. 5B. In FIG. 5B, the task pane 504 shown in FIG. 5A has been replaced with synchronize pane 514 and the synchronize button 506 appears "pushed in."

If the currently-selected folder is not presently synchronized, the synchronize pane 514 is a small initial pane containing introductory text that explains how synchronization works. When it is selected, the "Learn more about synchronization" link 518 opens a help window (or potentially a browser window showing help). Selecting an "Enable synchronization" button 516 sets up a folder selected in list 512 for synchronization.

If the collaborative system is not currently running at this point, it is started as set forth in step 406. As previously mentioned, since the Windows shell extension 306 does not have access to a transceiver necessary to directly communicate with the Groove collaborative system, it accesses the collaborative system by means of a web services interface exposed by the collaborative system. In particular, the Groove Workspace collaborative system software is modified to include Simple Object Access Protocol (SOAP) interfaces. With these interfaces, collaborative access methods are exposed in standard SOAP format so that other programs, such as the Windows shell extension 306, can use the SOAP language to communicate and interact with this collaborative client and to extract collaborative data even though they do not have the transceiver that is part of the collaborative system software.

Figure 6:
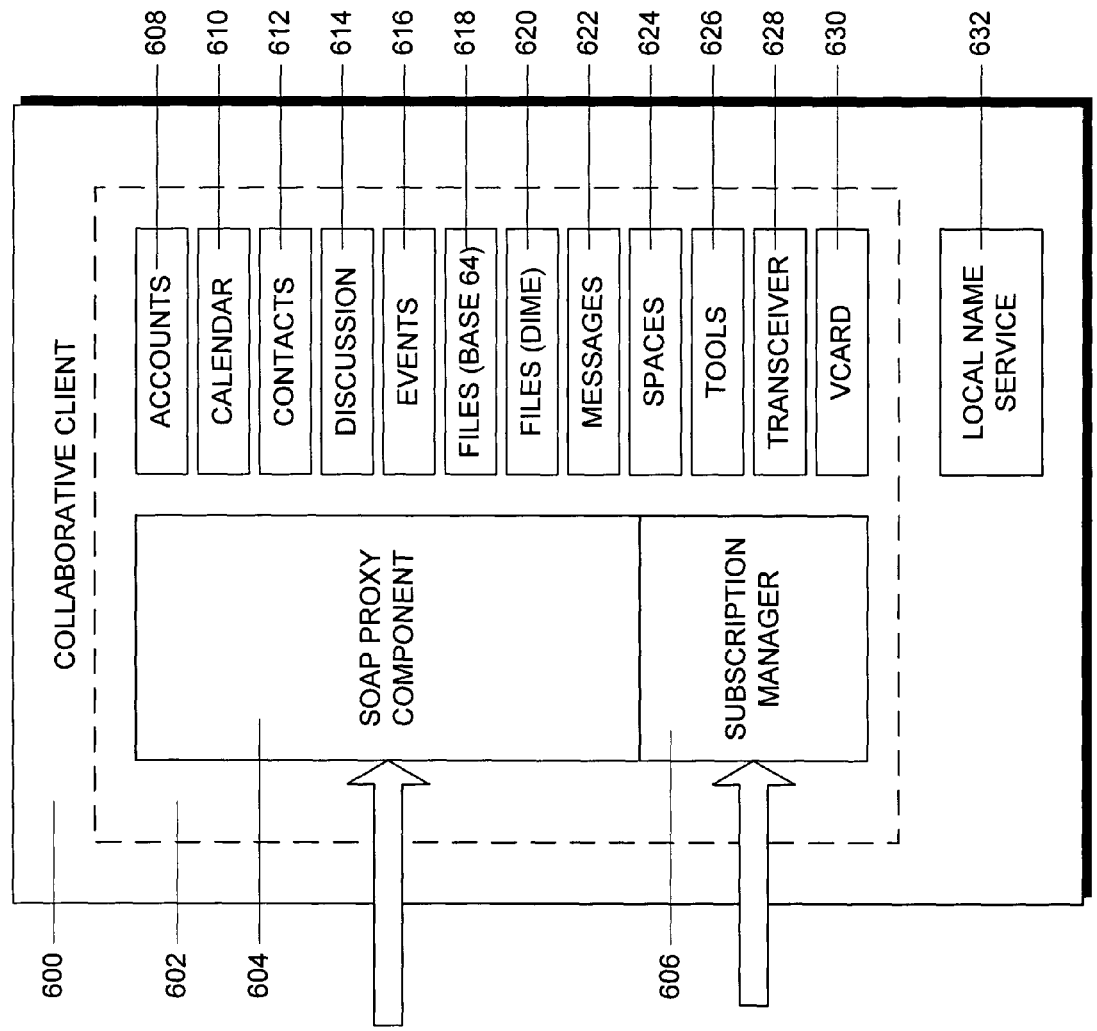
FIG. 6 is a schematic block diagram showing the internal construction of a SOAP engine on an illustrative collaborative client.

FIG. 6 is a block schematic diagram showing the internal construction of a SOAP engine 602 on an illustrative collaborative client 600 that processes SOAP messages such as those generated by the Windows shell extension 306. The SOAP engine includes a SOAP proxy component 604, a subscription manager 606 and various services 608-614. The SOAP engine 602 registers with a communication manager and indicates an interest in all incoming HTTP communications. In this manner, when the communication manager de-queues any data from these communications, the data, in the form of a SOAP envelope, is passed to the SOAP engine 602 for processing.

The SOAP proxy component 604 is a component that translates SOAP RPC requests into method invocations on a target COM interface. The component 604 is initialized with the system services on the collaborative client, and listens for incoming HTTP communications from a local SOAP server. When a communication is received, the SOAP proxy component 604 reads the header from the SOAP request. The SOAP proxy component 604 then determines the service being invoked and determines the target object from the SOAP header.

Then the proxy component 604 instantiates the service and optionally calls methods on the service if it implements certain interfaces, to determine more detailed context about the method. The proxy component then translates all inbound parameters from a SOAP representation to a COM (VARIANT) representation. Next, the selected service processes the data and generates a response. The proxy component 604 translates any return value back to a SOAP response envelope. The SOAP proxy component 604 then passes the envelope back to the local SOAP server. In particular, the SOAP engine 602, after processing the request, returns the result, in a SOAP response envelope, to a specific queue in the SOAP server owned by the SOAP client based on information from the original SOAP request.

Eleven services are illustrated in the collaborative client 600 that can be accessed via SOAP requests. These include the accounts service 608, the calendar service 610, the contacts service 612, the discussion service 614, the events service 616 the files (base 64) service 618, the files (DIME) service 620, the messages service 622, the spaces service 624, the tools service 626 and the transceiver service 628. Each service implements supports up to four methods, including Create( ), Read( ), Update( ) and Delete( ) methods. The Read( ) method retrieves a record or list of records. The Create( ) method creates a new record. The Update( ) method modifies an existing record and the Delete( ) method deletes an existing record. Each method is responsible for updating or returning collaborative data. In addition, services may provide similar methods that operate on data items managed by the service.

The accounts service 608 provides information about all the accounts on the local collaborative device and is a starting point for a hierarchical access to all web services available on the device. The calendar service 610 provides information about the events in a collaborative calendar tool and enables a SOAP client to create new events and delete or modify existing events. The contacts service 612 provides information about the collaborative contacts stored for an identity. The discussion service 614 provides information about the entries in a discussion tool and enables a SOAP client to create new entries and delete or modify existing entries. The events service 616 provides a mechanism for SOAP clients to retrieve web services events.

The files (base 64) service 618 provides information about files in a files tool and enables a SOAP client to read the contents of a file, create a new file, and delete or modify an existing file. The files (DIME) service 620 operates in the same manner and supports the same methods as the files (Base64) service 618, with the exception that it uses the SOAP DIME protocol to transfer the file contents. The messages service 622 provides a mechanism for remote SOAP clients to retrieve messages sent by the collaborative client but not received by the SOAP client because the time-to-live had expired. The spaces service 624 provides information about shared spaces owned by a specified identity. The tools service 626 provides information about the tools in a shared space.

The transceiver service 628 allows an external application to open a workspace window on the local device and direct the user to a specified URL or enables the user to send an instant message or shared space invitation. The V-card service 630 provides additional information about an identity, which information would typically be found in a v-card, such as an e-mail address and full name. Finally, the subscription manager 606 implements a subscription service that allows a remote endpoint to subscribe to any supported data model to receive notifications.

The operation of the web services interfaces is discussed in detail at Groove Networks' website and in U.S. patent application Ser. No. 10/615,281, filed on Jul. 8, 2003, now U.S. Pat. No. 7,363,342, by Weidong Wang, John Burkhardt, and Jack Ozzie and entitled METHOD AND APPARATUS FOR PROVIDING WEB SERVICES IN A COLLABORATIVE COMPUTING SYSTEM. The contents of this application are incorporated herein in their entirety by reference.

In one embodiment, using the web services interfaces and the transceiver service, the collaborative system is started automatically, without further intervention is from the user. Alternatively, the user can be asked, via a dialog box, whether the collaborative system should be started.

If the collaborative system is already running, it may still be necessary to obtain some initialization information. Some distributed collaboration systems, such as the aforementioned Groove Workspace collaboration system, are account based, so that an account for the folder synchronization must be determined. This can be determined in a straightforward fashion. First, the Windows shell extension uses the accounts service, via web services, to determine what accounts are logged-in. For example, if one and only one account is logged-in, then that account is used. Alternatively, if only one account exists on the user's machine, then that account is used (logging in, if necessary). If there is more than one account, the user can be prompted to select an account with a dialog box or some other mechanism. Further, if the selected account has multiple identities associated with it, a further prompt is made using an additional dialog box, to request that the user select an identity.

It is also possible to perform some safety checks at this point to warn the user if they try to enable synchronization for a folder that may not benefit from synchronization. For example, folders on removable media or remote drives cannot be synchronized. Similarly, folders that are already part of the collaborative system folder hierarchy of are part of the Windows XP Pro system directory cannot be synchronized. Finally, folders cannot be synchronized if the user does not have write permission to the folder or if the folder is already being synchronized by another collaborative system account.

Alternatively, if a folder that has synchronization is opened and the collaborative system is not running, then a task pane can be displayed that prompts the user to run the collaborative application. Similarly, if the collaborative system is running, but the account that enabled synchronization is not logged-in, then another task pane is displayed that prompts the user to log in (unless the account has no password and the log-in process can be automated.)

Assuming that the "Project X" folder has not yet been synchronized, when the Enable synchronization button 516 is selected, in accordance with the principles of the invention, the system synchronizes the collaborative system with the Windows shell file system folder. In particular, returning to FIG. 4, in step 408, the windows shell extension creates a new shared workspace (for example, shared space 1, 312 in FIG. 3). Since the account and identity are known, the Windows shell extension uses the collaborative system web services interface and the transceiver service to request that the collaborative system create a new file sharing workspace for the specified account and identity. This workspace is created from a predetermined template and includes a files tool, a document share engine 316, a chat tool (not shown in FIG. 3) and a comments tool (not shown in FIG. 3). The workspace template marks the workspace 312 as a special file sharing workspace. Also, when the workspace is created, the file path of the folder to be synchronized in the Windows shell file system 302 is passed in as a parameter to the collaborative system.

Next, in step 410, a mapping is added to the data store associated with the new workspace that associates the folder file path with the URL of the document share engine 316. The folder file path is also provided to the document share engine 316 at this time.

Then, in step 412, identification information (such as a GUID and an account URL that is mapped to the document share engine in the account data store) for the document share engine is stored in the Windows shell file system. This can be accomplished, for example, by adding a special file to the collaborative initialization directory (in the case of the aforementioned Groove Workspace collaborative system, this directory is "Groove.ini"), by writing to the desktop initialization file (desktop.ini) or by adding a mapping table in the operating system registry.

The process then proceeds, via off-page connectors 414 and 416 to step 418. In step 418 after the workspace is created, synchronization is triggered by populating the document share engine with file descriptors (step 418) and initializing the file synchronizer snapshots (step 422). At this point a consistent view exists across the Windows shell file system, the document share engine and the file synchronizer and the process finishes in step 424.

The Windows shell extension 306 then displays the workspace user interface for the synchronized folder. In particular, a full synchronize pane showing information related to the synchronized folder replaces the normal File and Folder task pane. The synchronize pane is generated by one of the aforementioned band objects and provides shared space information and options in the Windows Explorer Band for a synchronized file system folder. The Windows shell extension 306 uses web services to access the shared space and its document share engine (as indicated schematically by arrow 307) and then uses the spaces service to retrieve information regarding the file sharing workspace, such as the member list and member status.

Figure 7:
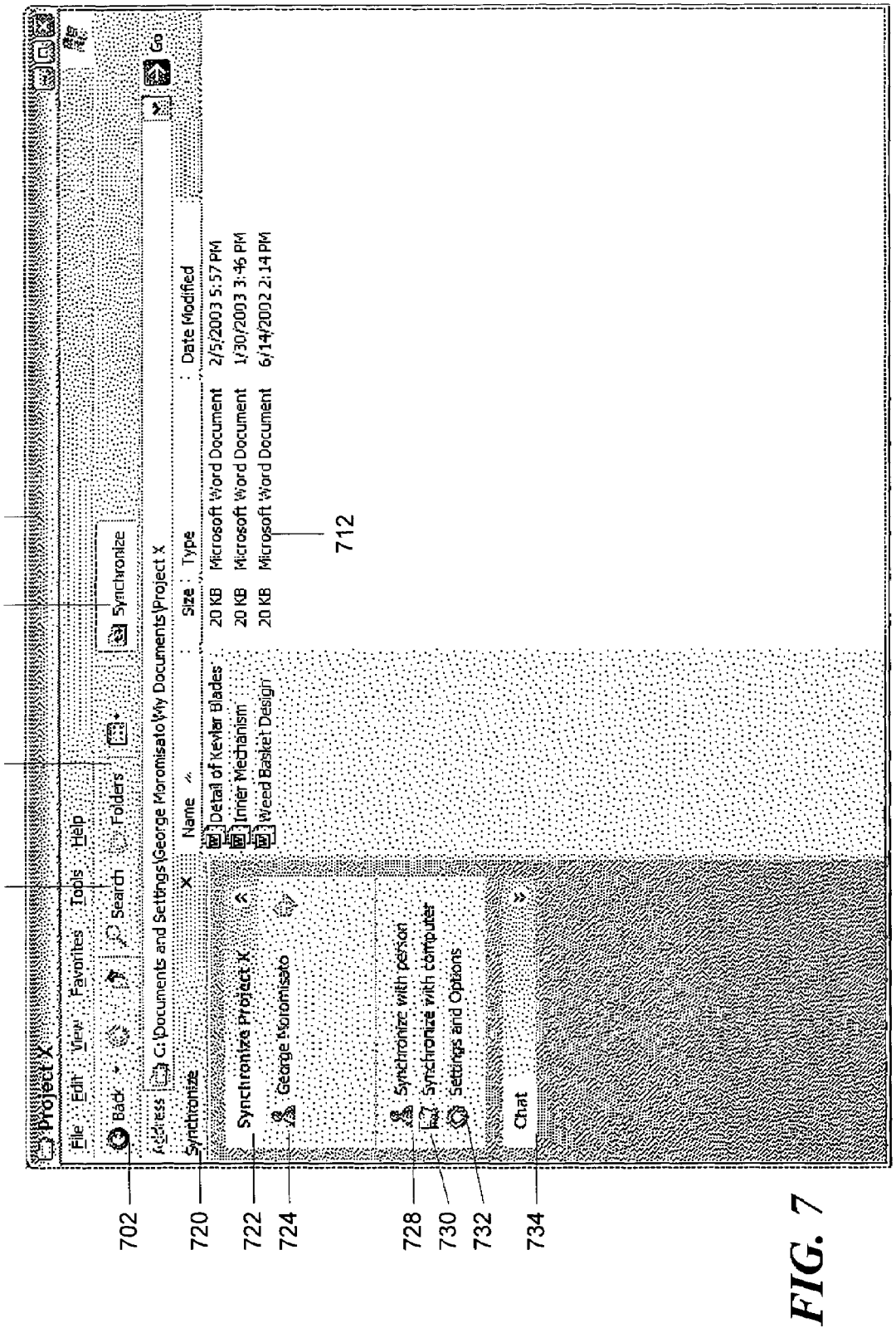
FIG. 7 is a screen shot of a screen display taken from a conventional operating system file system that has been modified in accordance with the principles of the invention to add a synchronize pane to the synchronization explorer band, which synchronize pane includes collaborator invitation options.
Figure 8:
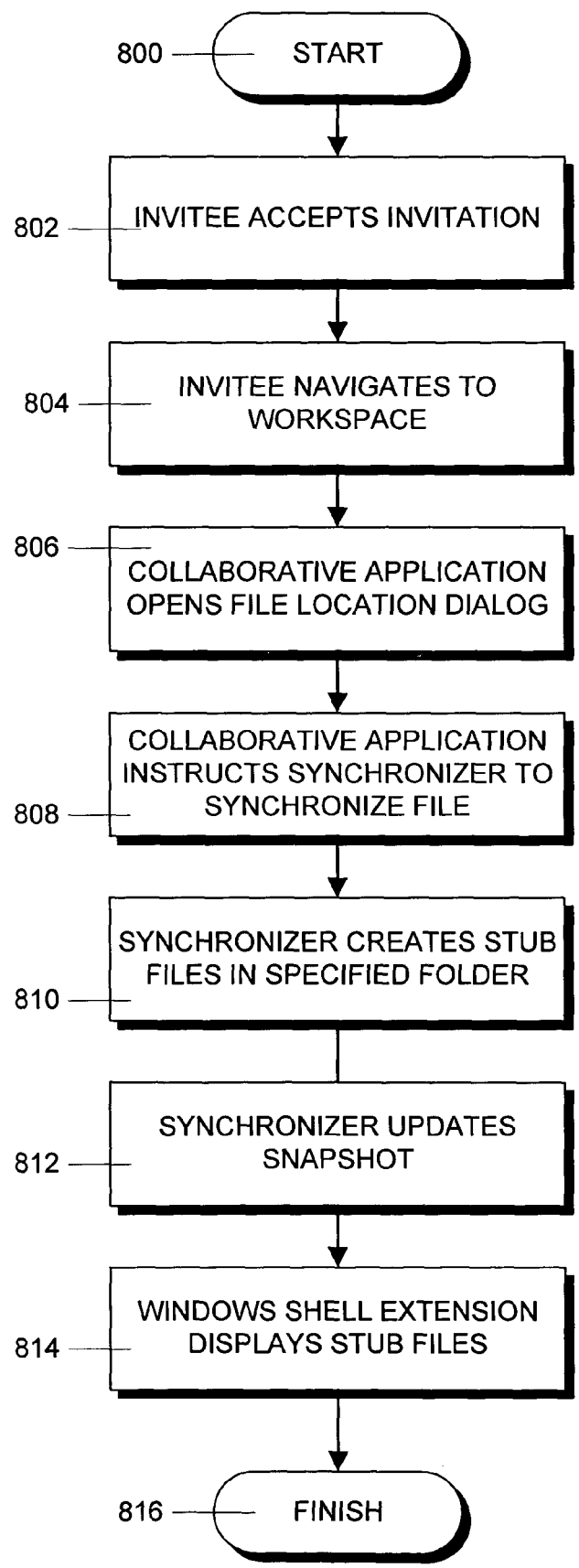
FIG. 8 is a flowchart showing the steps in an illustrative process by which files are synchronized when an invitee accepts an invitation.

FIG. 7 shows the full synchronize pane 720. As with FIGS. 5A and 5B, elements in FIG. 7 that correspond to elements in FIGS. 5A and 5B have been given corresponding numeral designations and will not be discussed further in connection with FIG. 7. For example, element 702 corresponds to element 502 in FIGS. 5A and 5B. The synchronize pane 720 displays shared space information and options for the synchronized OS file system folder (Project X in FIG. 8).

Since the folder may be synchronized with multiple shared spaces, the synchronize pane 720 includes a combo box 722 containing a list of the names of the synchronized shared spaces. The user selects the appropriate shared space name in the combo box 722 to display the related shared space information and options in the remainder of the synchronize pane 720.

In one embodiment, the shared space information in the synchronize pane 720 may include state information about the shared space selected in the combo box 722. The state information appears below the shared space combo box 722. As shown in FIG. 7, this information includes a member list 724 that, in turn, includes the member name and may include an icon representing the member. The shared space information may also include an authentication icon 726 for each member. Authentication icons may be generated in a manner described in more detail in the aforementioned co-pending U.S. patent application Ser. No. 10/631,206. The shared space information may also include a list of devices sharing the space for the current identity (not shown in FIG. 7.) The device list can include the name of each device. In FIG. 7, a single member is shown. This member would correspond to the user who has created the file sharing workspace.

Depending on the collaboration system, the member list 724 may also display the permissions of the members. For example, the aforementioned Groove Workspace collaborative system allows the creator of the shared space to assign "roles" to each of the members. These roles define whether the member can create, delete or modify files in the space. An option button, as discussed below, can be provided to open a dialog box that allows a role or permissions to be assigned to each member via the collaboration system.

The member list may also display additional icons or indicate by other means whether the listed members are on-line and available. This "awareness" mechanism may also display whether the listed members currently have a folder open in a window. The awareness mechanism can further indicate whether other members are actively working on any of the files in the folder. The awareness mechanism can be implemented by retrieving member information from the collaborative system via the web services interface and the spaces service 624.

Two option buttons 728-730 are provided to permit the user to invite new endpoints to the shared space. A button 728 opens a modal dialog box (not shown in FIG. 7) that provides options for synchronizing with a person, or inviting a new member into the shared space. Button 728 invites the new member into the shared space currently selected in combo box 722. A second button 730 (Synchronize with computer) opens another modal dialog box (not shown in FIG. 7) that provides options to invite other devices for the current identity into the selected shared space. This latter button also invites the device into the shared space currently selected in the combo box 722.

In accordance with the principles of the invention, invitations can be generated and sent from the OS file system user interface in the same manner as normal invitations are generated and sent in the collaborative system. For the manner in which invitations are sent and received in the aforementioned Groove Workspace collaboration system, see U.S. patent application Ser. No. 09/571,851 filed on May 12, 2000 entitled METHOD AND APPARATUS FOR MANAGING SECURE COLLABORATIVE TRANSACTIONS, by Walter E. Tuvell and Nimisha Asthagiri, the contents of which are hereby incorporated by reference herein. In particular, the Windows shell extension 306, via the web service interface, uses the transceiver service to issue the invitation in the normal collaborative system manner. This operation allows the invitation to follow all of the normal protocol within the collaborative system process.

In the latter Groove system, after an invitation is issued, the invitee must accept the invitation in order to join the shared space. After an invitation is sent, the invitee shows up in the member list. Some mechanism can be used to indicate that the invitee has not yet accepted the invitation. For example, the user interface could display the word "Pending" in parentheses after the invitee name.

In accordance with the aforementioned Groove Workspace collaborative system protocol, the invitee receives a notification of an invitation generally via an e-mail notice. The process that occurs during the acceptance of an invitation is shown in the flowchart illustrated in FIG. 8. This process begins in step 800 and proceeds to step 802 where the invitee accepts the invitation generally by clicking on an accept button on the invitation. As set forth in step 804, the invitee then navigates to the space either for the first time by means of a link forwarded by the member who invited the invitee or by means of the collaborative system user interface. If the collaborative system is not running on the invitees system at this point, it is started at this time.

Next, in step 806, the collaborative system examines the workspace type and performs a lookup in a registration table to determine the type of application that should be launched to view the workspace in the collaborative system. Typically, this latter application would be the default workspace viewer in the collaborative system. The collaborative system then examines the workspace and checks for a Windows shell file system path for the folder on the invitee's computer that is to be synchronized. Since the space is new, the path will not yet have been set and the collaborative system displays a dialog box similar to that illustrated in FIG. 9 in order to prompt the invitee to specify a location where the new synchronized folder can be stored in the OS file system in the invitee's computer. This dialog box allows the invitee to create a new location for the folder/workspace, or to merge the new folder/workspace with an existing folder.

Figure 9:
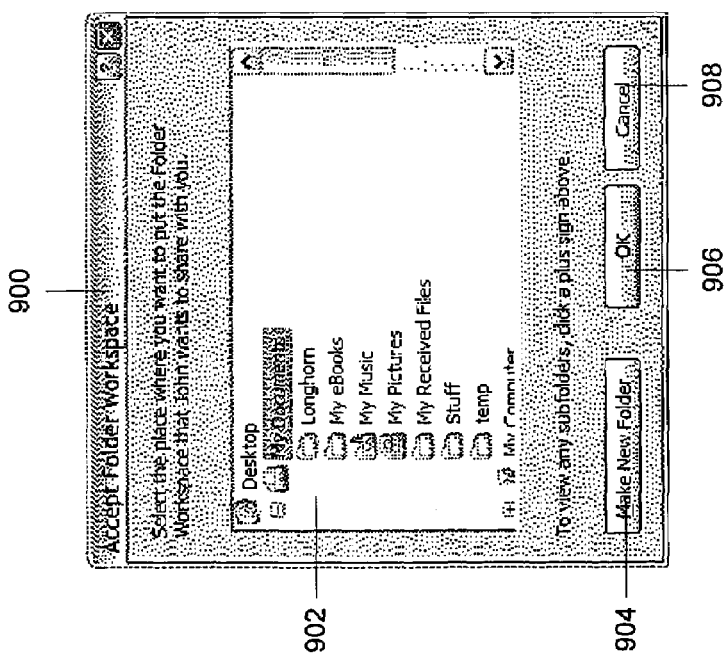
FIG. 9 is a screen shot of a screen display of a dialog box that allows an invitee to select a location for a folder workspace to which he or she has been invited.

As shown in FIG. 9, the dialog box 900 displays a directory list 902 that allows the invitee to select an existing location in which to merge the new workspace. A new folder can also be created for the new workspace by using the new folder command button 904. When a folder is chosen or a new folder is created, the invitee can then accept the action with the "OK" command button 906 or discard the choice with the "Cancel" command button 908. Once the location has been selected, the directory is initialized and the collaborative system launches the Windows shell file system and navigates to the specified folder.

Alternatively, if the new shared space has already been associated with a folder, then the file sharing system 303 simply runs the Windows shell file system by executing the program explorer.exe and navigates to that folder.

The collaborative application then instructs the file synchronizer 308 to synchronize the specified folder in step 808. The file synchronizer 308 checks with the document share engine in the new workspace and determines that there are three files entitled "Detail of Kevlar Blades", "Inner Mechanism" and "Weed Basket Design" in the synchronized folder "Project X" and that the specified folder does not have these files and that there are no snapshots for these files. Therefore, these files must be created.

In a server-based collaborative system in which all files are kept on the server, the file to be synchronized will already be available to the user. However in server-based collaborative systems that use local data copies and in distributed collaborative systems, that provide asymmetric file service as discussed above, the file may not be present on the local data store and must be downloaded to the local data store from an appropriate source. In the case of server-based systems, that source will be the server. In distributed collaborative systems, that source will be the local data store of another collaborator.

In accordance with one aspect of the invention, the file can be downloaded at this point or can be downloaded at another time or as requested by the user. Returning to FIG. 7, the "Settings and Options" link 732 allows the user to set selected options by replacing the synchronize pane 720 with a new task pane that can be similar to task pane 1040 illustrated in FIG. 10. In task pane 1040, the download settings radio button control 1042 controls when synchronization occurs and what is synchronized when synchronization does occur. In general, synchronization occurs approximately when changes have been made to any of the synchronized files. In one embodiment, the synchronization is asynchronous and there may be a small suppression timer to insure that synchronization does not occur too often.

In particular, download of the file data is controlled by download settings that can be selected by radio buttons 1042. The download settings can be: (1) Always download new files; (2) Download new files if the file sizes are smaller than a selected number of kilobytes (where the selected number of kilobytes can be entered into textbox 944) and (3) Download new files manually as specified by the user. In one embodiment, the download settings are applied to the entire folder. By default, the setting of radio buttons 1042 can be "Download new files manually."

If the download settings are such that file downloading is deferred to a later time, that file is represented in the OS file system as a "stub" file that is very similar to a Windows shortcut (.lnk file) in that it represents a target file with a small file that contains information necessary to find the target file. The stub file is represented in the user interface by the same icon as the target file, but it may have an overlay of some sort that indicates that it is a stub file in a manner similar to the hand overlay shown in FIG. 1.

Assuming that the file will not be downloaded at the time that the new synchronized folder is initialized, in step 810, the file synchronizer 308 creates three stub files to represent the three files in the synchronized space. Each of these stub files is bound to the Windows shell extension 306 so that the Windows shell extension 306 is run when the file is opened. In step 812, the file synchronizer 308 creates three snapshots of the three stub files in the new directory.

Finally, in step 814, the Windows shell file system 302 is updated by the Windows shell extension 306 so that the invitee sees the new stub files along with a synchronize pane that shows details of the new workspace and the member that invited the invitee. The process then ends in step 816.

In one embodiment, the user can download the target file associated with a stub file by double clicking on the stub file icon. A menu with appropriate actions would then appear. This menu might include actions such as: "Download" (the default action) and "Download From." The "Download From" option is used with a distributed collaboration system and displays a pop-up menu listing the endpoints from which the target file may be fetched. Also, when a stub file is selected, the synchronize pane may show an area that lets the user initiate a download.

Figure 10:
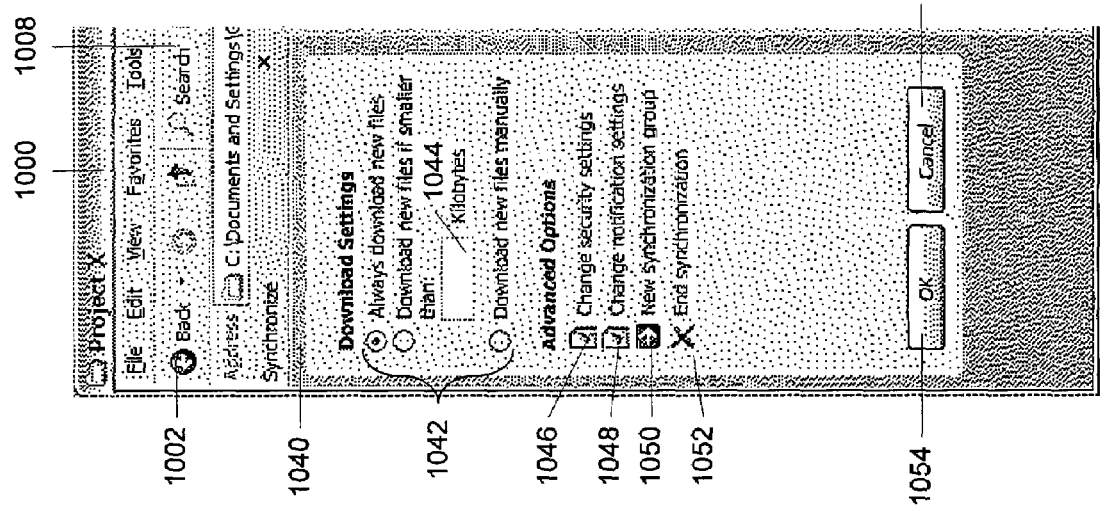
FIG. 10 is a screen shot of a setting and options pane that is displayed when a user selects the "settings and options" link 732 shown in FIG. 7.

In FIG. 10, the "Change security settings" link 1046 opens a dialog box (not shown in FIG. 10) that lets the user set roles and permissions for the workspace. The "Change notification settings" link 1048 opens a dialog box (also not shown in FIG. 10) that lets the user set notification levels (high, medium, low, etc.) The "New synchronization group" link 1050 opens a dialog box (not shown in FIG. 10) that lets the user create a new workspace either in the same folder or in any folder within the current synchronization workspace. Finally, the "End synchronization" link 1052 ends the synchronization. Selecting link 1052 opens a secondary dialog box that allows the user to withdraw from the space (get uninvited), remove the space from the current device, or shut down the space for everyone. The selected options are applied or discarded by selecting the appropriate command button 1054 or 1056. A selection of either button 1054 or 1056 closes the options pane 1040 and restores the synchronize pane 720 (FIG. 7.)

Figure 11:
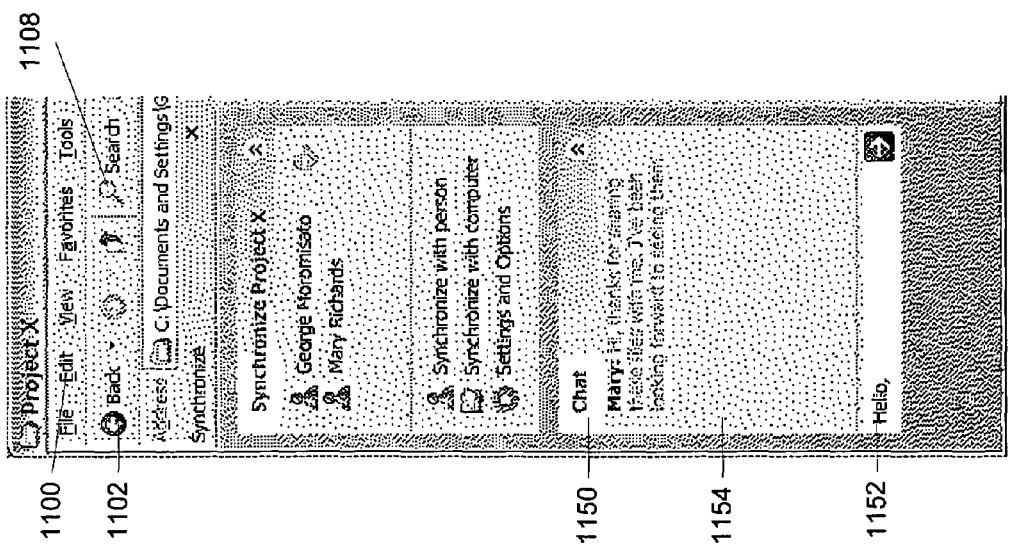
FIG. 11 is a screen shot of a chat pane that is displayed when a user selects the chat selection 734 shown in FIG. 7.

The synchronize pane 720 also includes a "chat" section 734 that can be expanded as shown in FIG. 11. The chat pane 1150 includes a combo box 1152 that allows the user to select an on-line member to engage in a chat. Another area 1154 is provided to allow the user to type in the chat message. The chat function is implemented by the Windows shell extension 306 that, in turn, uses the web services interface and the transceiver function of the collaborative system to provide chat services.

Figure 12:
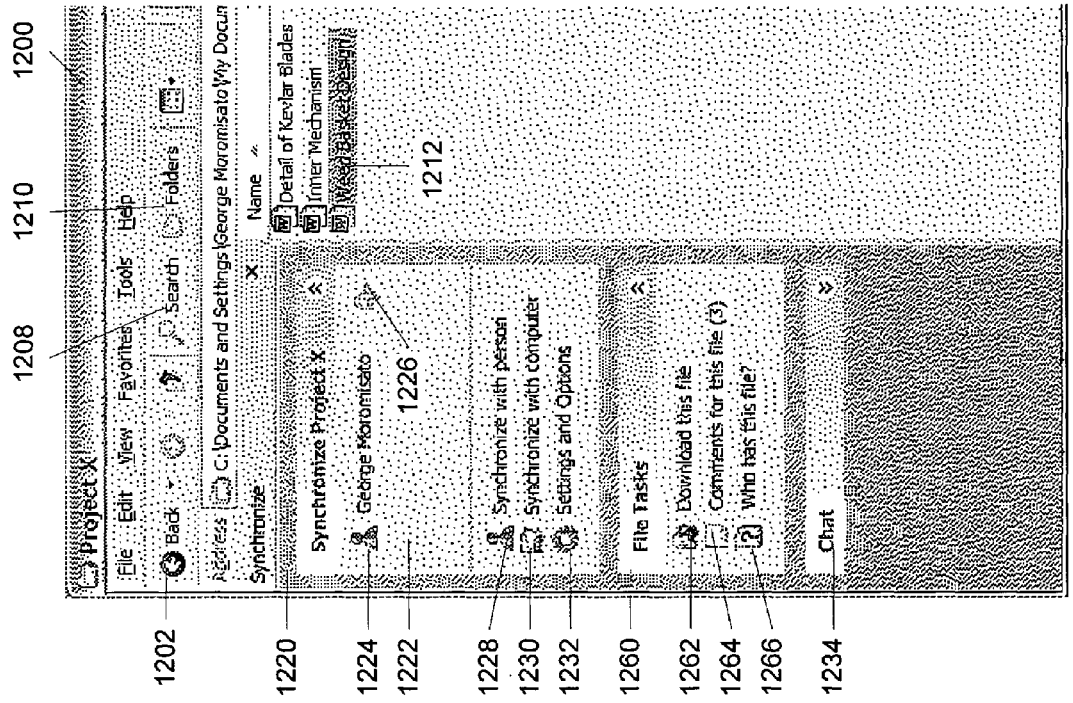
FIG. 12 is a screen shot of a file task pane that is displayed when a user selects a file or folder in the file list 712 shown in FIG. 7.

Returning to FIG. 7, when a synchronized file is selected in the file list 712, a new section is added to the synchronize pane 720 that is devoted to tasks available for that file. An example of this new section is illustrated in FIG. 12. The tasks illustrated in FIG. 12 depend on the file selection and generally include operations on a file that make sense in the context of synchronization.

For example, a file upload button 1262 and a file download button 1263 can be provided. The upload button 1262 is only enabled when one or more non-stub files (files where the contents are stored on the local data store) are selected in the file list 1212. The upload button allows a user to "push" the selected file contents to specified endpoint(s) in one or more of the synchronized shared spaces. When this button is selected, a pop-up menu appears that allows the user to select an endpoint to which the file will be pushed.

The download button 1263 is only enabled when one or more stub files are selected in the file list 1216. The download button 1263 triggers a fetch request for the contents of the selected stub files. The request is delivered to each endpoint across all the synchronized spaces for the specified file system folder.

Figure 13:
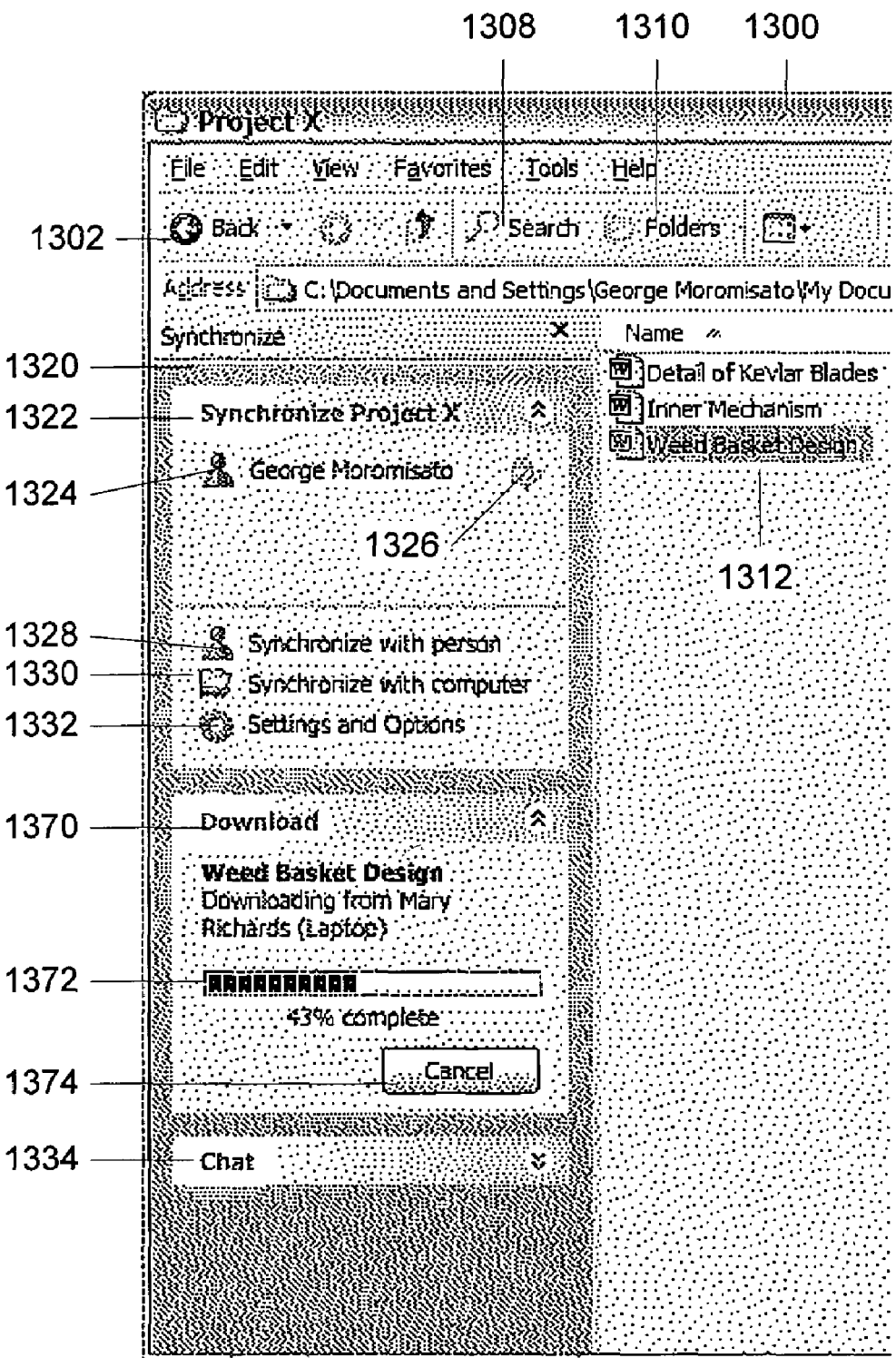
FIG. 13 is a screen shot of a file download pane that is displayed when a user selects the file download selection 1262 shown in FIG. 12.

In any case, the user/invitee at some point will download the file either be double clicking on it or by selecting the file in a list and then using the file tasks pane to download the file. The Windows shell extension 306 is invoked as discussed above and accesses the collaborative system via the web services interface. It uses the files tool in the shared space to fetch the file. When a file is being downloaded, a download pane 1370 such as that illustrated in FIG. 13 appears in the synchronize pane 1320. The download pane 1370 displays the status of the download, for example, by means of a progress bar 1372 or other means. A "Cancel" button 1374 allows the user to cancel the download. The download pane 1370 always applies to the selected file. If there is no selection but some files are being downloaded then, in one embodiment, the download pane may show a statement such as "Downloading 3 files" in place of the progress bar 1372. If there are multiple files selected and all the files are stubs being downloaded then a similar statement can be shown. The information in this pane is provided by the Windows shell extension that, in turn, uses the files tool in the shared space (via the web services interface) to get the required information.

When the file arrives, the stub file representing the actual file is replaced by the actual file and the file system snapshot is updated to indicate that the file contents have changed.

Returning to FIG. 12, some additional task and operations can be performed. The "Comments for this file" link 1264 opens a comments pane (not shown in FIG. 12). The number in parenthesis following the link 1264 indicates the number of comments for the selected file. This function is also implemented by the Windows shell extension by using the services of the collaborative system, via the web services interfaces. The "Who has this file?" link 1266 opens a dialog box (not shown in FIG. 12) that shows a list of all members of the space along with a column specifying whether or not the given member has a copy of the selected file. If a member does not have a copy, then the aforementioned upload button lets the user "push" the file to that member. In another embodiment, an indication can be added to the latter dialog box to show whether or not a user has ever opened (that is, read) the selected file. This function is implemented by the Windows shell extension 306 which accesses the document share engine 312, via the web services interfaces.

Once a folder has been synchronized, the folder icon displayed in the OS file system user interface display that represents that file is provided with an icon overlay that indicates it is synchronized through the collaborative system. The icon overlay can be similar to the "hand" overlay 114 (FIG. 1) displayed by Windows XP Pro file system when a folder is shared over the network. The synchronized folder icon overlay is provided by an icon overlay shell extension, which is only available on Windows 2000 or later. More details on icon overlay shell extensions are available from Microsoft through its website.

The "Details" view in Windows Explorer displays columns of information about each file in the file system. In one embodiment, synchronized folders display extended column information (download state, download progress, etc.) for each file. The column extensions are provided by a column handler shell extension, which is only available on Windows 2000 or later. More details on column handler shell extensions are available from Microsoft through its website.

It is also possible to display extended information in "infotips" for contents of synchronized folders. The extended information can include download state and progress for synchronized files. The infotip extensions are provided by an infotip shell extension, which is only available on Windows 2000 or later. See http://msdn.microsoft.com/msdnmag/issues/0300/w2kui/default.aspx for more details on column handler shell extensions.

In another embodiment, the context menu for stub files can provide an option for downloading the associated file contents. When the file contents are downloaded, the stub file is upgraded to a file of the necessary type. The context menu options are provided by a context menu shell extension. More details on context menu shell extensions are available from Microsoft through its website.

In yet another embodiment, property dialog boxes for synchronized folders can contain additional tabs containing additional information with respect to the collaborative system. This information can include, for example: folder permissions for synchronized shared spaces. Each tab contains a combo box for selecting the synchronized shared space used for displaying the permission and share information. Property sheet shell extension handlers provide the extended tabs in the Property dialog box for the synchronized folder. The above information is only available when the user is logged onto the collaborative system locally. Otherwise, when logged off, the tabs contain placeholder text indicating that the user needs to log onto the collaborative system to obtain information. More details on property sheet handlers are available from Microsoft through its website.

Returning to FIG. 3, as previously mentioned, document share engines 312, 316, 320 and 324 are associated with shared spaces 310, 314, 318, and 322. Each document share engine stores shared file information and the file contents. By default, this information is stored in the collaborative system storage. Each document share engine, for example, document share engine 312, communicates with the file synchronizer 308 to manage the files in a synchronized folder. Document share engine 312 will be discussed in detail below, however, it should be understood that all document share engines function in substantially the same manner. In order to support folder synchronization, document share engine 312 engine stores the following information: folder download settings per endpoint, file download settings per endpoint, synchronization mode properties and specialized version handling for binary difference dissemination support (discussed below.)

Document share engine 312 provides asymmetric file service through the global folder/file download settings that specify whether and when a file is downloaded. These settings are discussed above with respect to the "Settings and options link." Initially, the contents of a synchronized file can be manually or automatically delivered through the file transfer service provided with the collaborative system in accordance with the aforementioned download settings and as discussed above. The file contents are then delivered via data change requests to all endpoints in the shared space.

Once the initial download is complete, a file with downloaded contents will be always in automatic download mode. Under this condition, downloaded files are never out-of-date. Therefore, after a download of the target file contents has been concluded on a stub file, the resultant file utilizes automatic download mode for future updates even though the folder download setting may specify that downloads are manual. In addition, a file in automatic download mode is kept in automatic mode after the initial download even if the folder download setting is later changed to "manual download." Due to these restrictions, file download settings must be maintained for each endpoint and, for consistency, folder download settings are also maintained for each endpoint. Newly created files and folders inherit the download settings of any parent folder.

Endpoint download settings are disseminated to all shared space members via data change requests. The members use the disseminated download settings to automatically direct new file content updates to those members that are in automatic download mode. In particular, the disseminated download settings of all endpoints for a particular file are inspected in order to target those endpoints in manual mode with file descriptor information and to target those endpoints in automatic mode with file descriptor information and file contents.

Document share engine 312 maintains and persists a file system synchronization mode property that relates only to that engine. The file synchronization mode property has two values: file system synchronization enabled and file system synchronization disabled. By default, file system synchronization is disabled and folder contents are stored in the collaborative system storage. In response to file content changes, document share engine 312 targets data change requests either to the OS file system (through the file synchronizer 308) or to the collaborative system storage depending on the file system synchronization mode. Specifically, when file system synchronization is enabled on a folder, the engine uses the file synchronizer 308 to export the folder contents to the specified OS file system folder. When the file system synchronization is disabled, the engine uses the file synchronizer 308 to download the folder contents into the collaborative system storage. As mentioned above, in a distributed collaboration system, file contents that must be downloaded to a collaborator can exist on any endpoint across the synchronized shared space. Thus, each document share engine must be prepared to handle the reception of file contents from a file download request that is initiated by the file synchronizer 308. Document share engine 312 provides a policy to enable folder synchronization in the engine. The policy allows the shared space manager to advise members not to synchronize the files in their own file systems.

In one embodiment, document share engine 312 provides support for the dissemination of file content changes using binary differences. This support requires that the document share engine persist old versions of file content as base versions for creating binary differences for dissemination of file changes and for restoring file content versions from incoming binary differences.

Binary difference dissemination support for synchronized files requires mirroring of versions in the collaborative system storage. Since this mirroring consumes additional disk space, document share engine 312 employs techniques for minimizing the degree of file version mirroring. These techniques include delaying mirroring of the synchronized file system file versions until the initial update of file contents. The initial update to a file causes the new file contents to be stored in the collaborative system storage as well as in the OS file system. The file contents for all subsequent updates are then stored in the collaborative system storage while only the latest file contents are represented in the OS file system. The first update for each file cannot be disseminated as binary differences since the previous file content version is not available in the collaborative system storage at that time. However, subsequent file changes are disseminated as binary differences. The collaborative system storage maintains the history of the file contents until they are purged through a conventional purge event.

Binary difference support can be disabled through a local-only setting on folders and files. When binary difference support is disabled, document share engine 312 does not store old file versions in the collaborative system storage.

File synchronizer 308 is responsible for maintaining file system synchronization between the OS file system and the collaborative system synchronized "sites" in shared spaces. The synchronization process handles several scenarios including (1) conflicting changes across the file system folder and the collaborative system synchronized "sites" (document share engines), (2) permission mismatches between the collaborative system "sites" that are synchronized with the same file system folder, (3) the handling of stub files across collaborative system synchronized "sites", and (4) multiple, collaborative system synchronized "sites"

In particular, an OS file system folder may be synchronized with multiple collaborative system "sites", each with its own set of members. For example, a single folder may be synchronized simultaneously with two different groups of people. File synchronizer 308 associates the OS file system folder with the synchronized collaborative system "sites" by maintaining a mapping between the OS file system folder path and a unique address for the synchronized "sites". The design of the file synchronizer is such that the result of a synchronization (including the handling of conflicts) is consistent and deterministic across multiple "sites". Without this consistency, it would be impossible to prevent synchronization loops, in which the creation of a conflict file in one "site" spawns additional conflicts in an associated "site".

File synchronizer 308 supports automatic and manual synchronization of changes between the synchronized file system folder and the collaborative system "sites". The automatic synchronization mode requires that changes to a file be synchronized as they happen. The manual synchronization mode requires reconciling changes that have been accumulating across the different synchronized locations (OS file system folder and collaborative system "sites") when file synchronization is requested by a user.

In operation, the file synchronizer first detects file system updates made at the collaborative system sites and the OS file system. This is done by comparing the present state of the collaborative system sites and the present state of the OS file system with the file system snapshot that is maintained in the document share engine 312. Then, any conflict between the conflicting operations in the multiple file systems must be resolved. Typically, the resolution procedure is performed by an algorithm. Any remaining conflicts may require user input. Conventional synchronization techniques and algorithms for resolving conflicts are discussed in detail in an article entitled "What is a File synchronizer?", S. Balasubramaniam and B. C. Pierce, Indiana University CSCI Technical report #507, Apr. 22, 1998, and an article entitled "An Algebraic Approach to File Synchronization", N. Ramsey and E. Csirmaz, Foundations of Software Engineering, 2001. These articles are hereby incorporated herein in their entirety by reference.

Once the file synchronizer 308 determines that the file system has been changed it passes the changes to the document share engine in the shared workspace which thereupon disseminates the changes. If a file has been edited, then the document share engine may either disseminate the entire updated file contents or determine the changes made to the file by comparing the current file contents against a copy of the contents that it maintains and disseminate only the differences.

Figure 14A:
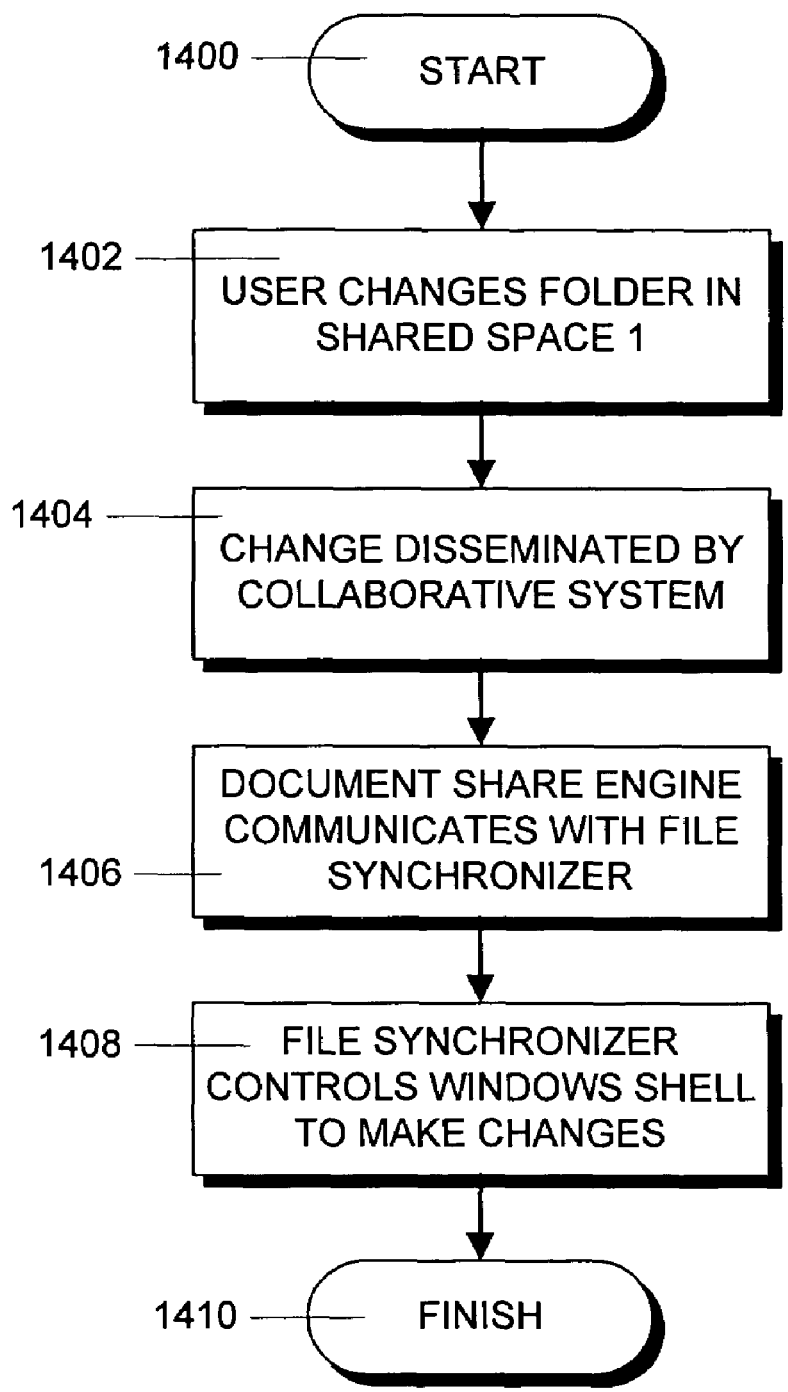
FIG. 14A is a flowchart showing the steps in an illustrative process for synchronizing a change made in the collaborative system with the OS file system.

The steps involved in processing a folder change that originates in a shared space, such as shared space 1 (310, FIG. 3), are illustrated in FIG. 14A. This process begins in step 1400 and proceeds to step 1402 where a change is made in shared space 1 (310) to a synchronized folder or its contents. This change might be a file edit, the addition of a file or the deletion of a file and might be made by a user or another computer, such as a server. This change is disseminated to the computers of all members of the shared space through the normal mechanisms of the collaboration system as set forth in step 1404. In step 1406, when the document share engine 312 in a computer of a member of the shared space 1 310 receives the change, it communicates with the file synchronizer 308 as indicated by arrow 326. In step 1408, the file synchronizer 308 then controls the Windows shell file system 302 to make the change as indicated by arrow 338. Thus the change made in shared space 1 310 is now automatically reflected on the Windows shell file system. The process then ends in step 1410.

Figure 14B:
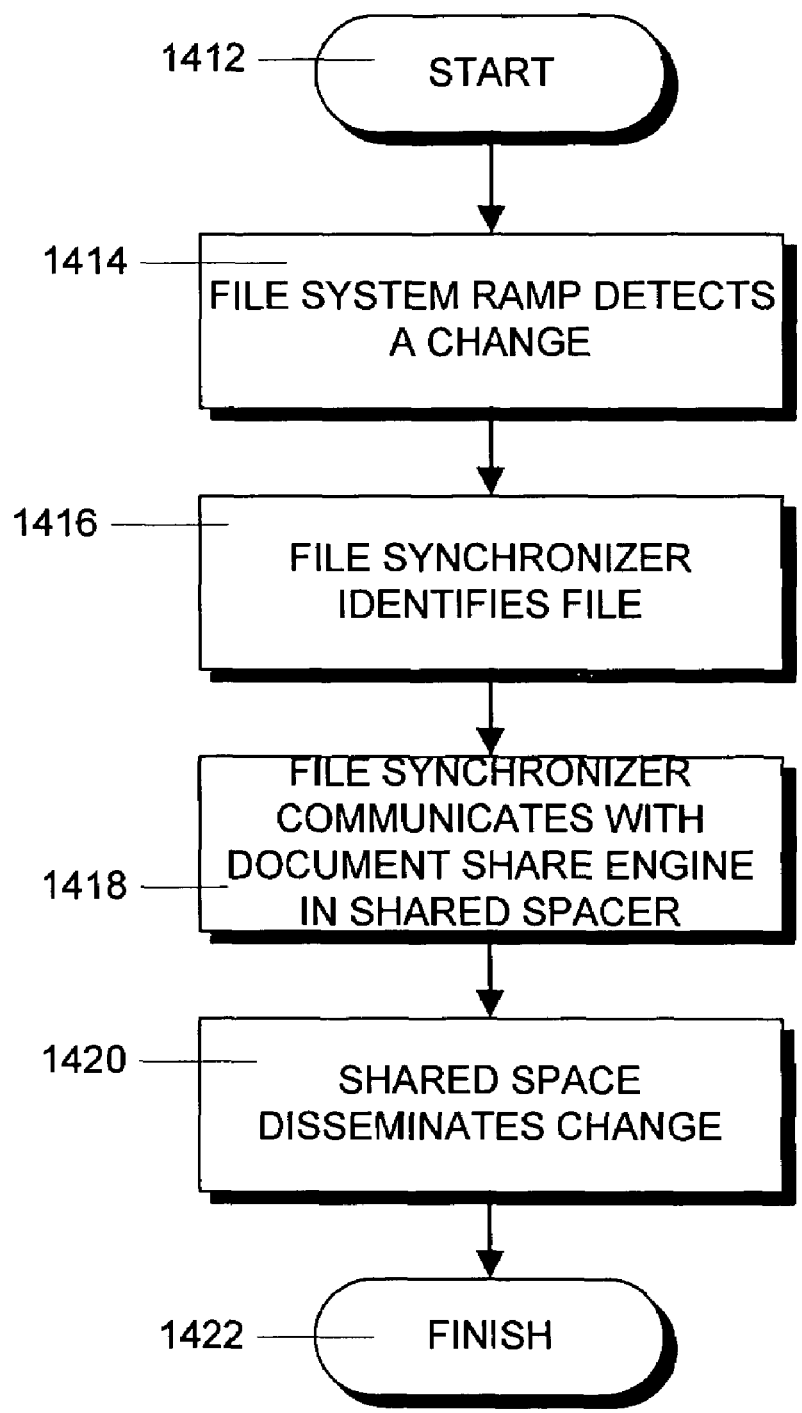
FIG. 14B is a flowchart showing the steps in an illustrative process for synchronizing a change made in the OS file system with the files in the collaborative system.

FIG. 14B shows a similar process in which a user modifies a file in the OS file system. This process begins in step 1412 and proceeds to step 1414 where the file system RAMP 304 detects that change and communicates with the file synchronizer 308. The file synchronizer 308 then uses its snapshot to determine which file needs to be synchronized in step 1416. Once the file synchronizer determines which change needs to be made, it communicates with the document share engine of the shared space associated with the synchronized folder (for example, document share engine 312) to disseminate the change as set forth in step 1418. Once the shared space 1 (310) receives the change, in step 1420, it will disseminate the change using the normal mechanisms of the collaboration system. In this way, all members of the shared space will receive the change. The process then ends in step 1422.

As mentioned above, files that do not have contents are called stub files and are only maintained and synchronized between the originating collaborative system "site" and the OS file system folder. The stub files are not synchronized with non-originating collaborative system "sites". Stub files can be upgraded to content files by downloading the file contents and, upon upgrade, the file synchronizer 308 forwards the new content file to the non-originating collaborative system "sites". Thus, the file synchronizer 308 is not required to forward fetch requests made from non-originating collaborative system "sites" to the originating collaborative system "site".

Alternatively, content files can be downgraded to stub files. After downgrading, future content changes to the file are no longer synchronized across all the shared spaces/tools that are synchronized with that folder. As edits are processed in each of the synchronized spaces/tools, the contents of that file diverge between those synchronized spaces/tools. Therefore, the downgrade may require creation of a separate stub file for each shared space/tool that is synchronized with that parent folder. This way each stub file can avoid synchronizing with non-originating collaborative system "sites"

File synchronizer 308 also handles conflicts between the synchronized OS file system folder and collaborative system "sites". In particular, file synchronizer 308 associates a unique version identifier and the last modified time with each change made to a synchronized file. File synchronizer 308 then tracks the version identifier/last modified time that is current for the file in each synchronized location. When a change to the file arrives from a particular synchronized location, file synchronizer 308 can determine a conflict condition by investigating the base version identifier/last modified time information for that file and determining if it is out-of-date with the latest known version identifier/last modified time across all synchronized locations. The following are some common conflict scenarios:

File edit (replace)/file edit (replace) conflict
File edit/file deletion conflict
Add file/parent folder deletion conflict
Add folder/parent folder deletion conflict File synchronizer 308 may use a naming convention for the conflict files/folders that does not reveal confidential information about other shared spaces synchronizing with the same folder.

In addition, permission mismatch scenarios can happen across collaborative system "sites" synchronized with the same OS file system folder. When the synchronized file system folder permissions are too restrictive to support the collaborative system "site" permissions, file synchronizer 308 can no longer synchronize the OS file system folder. In this case, the user is warned that the file system folder permissions need to be less restrictive to continue proper synchronization.

The following are some permission mismatches between collaborative system "sites" synchronized to the same file system folder and the illustrative file synchronizer resolutions to these scenarios.

An Edit Permission/No Edit Permission collision can occur due to an edit permission/no edit permission mismatch in the following manner:

Collaborative system "site" A has edit permission
Collaborative system "site" B does not have edit permission
Edits are made in either collaborative system "site" A or the synchronized OS file system folder
Remote edits arrive to Collaborative system "site" B; however, these edits cannot be synchronized through collaborative system "site" B due to lack of permission.

In this case, file synchronizer 308 creates a conflict when detecting mismatch between base version identifier/last modified time of the collaborative system "site" B edit and the latest synchronized version identifier/last modified time for the file.

Another collision can occur due to the add file (folder) permission/no add file (folder) permission mismatch in the following manner:

Collaborative system "site" A has add file (folder) permission
Collaborative system "site" B does not have add file (folder) permission
File (folder) is added to either collaborative system "site" A or the synchronized file system folder
Added file (folder) in the previous step is not allowed to be synchronized through collaborative system "site" B
Collaborative system "site" B receives add file (folder) permission In this case, file synchronizer 308 needs to synchronize collaborative system "site" B with the newly added file (folder).

A further collision can occur due to the delete file (folder) permission/no delete file (folder) permission mismatch in the following manner:

Collaborative system "site" A has delete file (folder) permission
Collaborative system "site" B does not have delete file (folder) permission
A file (folder) is deleted by either collaborative system "site" A or the synchronized file system folder In this case, for the deleted file, file synchronizer places a stub file in replacement of deleted file to satisfy the collaborative system "site" B permission. For the deleted folder, the file synchronizer 308 then adds the folder back to the file system folder and collaborative system "site" A to satisfy the collaborative system "site" B permission.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, protocols and translations different from those shown may be performed. Other aspects, such as the specific process flow and the order of the illustrated steps, as well as other modifications to the inventive concept are intended to be covered by the appended claims.

What is claimed is:

1. A method for providing information and services of a collaboration system adapted for communicating changes to at least one shared space in a data change format that allows a plurality of members to interact collaboratively in a shared folder in a folder-based file system that is part of an operating system with a user interface, the method comprising:

(a) including a collaborative interface in the operating system user interface of a first computer, the collaborative interface adapted to receive user input identifying a synchronized file;

(b) receiving at the first computer, from the collaboration system, information regarding members of the plurality of members collaborating within the context of a shared folder containing the synchronized file through the use of the collaboration system and using the collaborative interface to display the information;

(c) within the operating system, automatically determining changes made to information stored as a file in the folder-based file system and providing a notification of a determined changed to the collaboration system;

(d) in response to the notification of the determined change, determining, within the collaboration system, whether the change relates to the synchronized file;

(e) when the change relates to the at least one synchronized file, communicating the change to the plurality of members collaborating within the context of the shared folder, the change being communicated via a first data change message formatted in accordance with the data change format of the collaboration system;

(f) receiving at the first computer a second data change message formatted in accordance with the data change format of the collaboration system, the second data change message communicating a change made to the synchronized file by a user of a second computer; and (g) changing the synchronized file within the operating system on the first computer based on the second data change message.

2. The method of claim 1 wherein a portion of the user interface is implemented as the collaborative interface.

3. The method of claim 1 wherein the user interface is enhanced to include the collaborative interface.

4. The method of claim 1 wherein a portion of the user interface is replaced with the collaborative interface.

5. The method of claim 1, further comprising, in response to the user input identifying a synchronized file received using the collaborative interface, creating a shared space within the collaboration system associated with the synchronized file.

6. The method of claim 5, further comprising using the collaborative interface to initiate sending an invitation by the collaboration system to a member of the plurality of members to join the shared space.

7. The method of claim 5 wherein step (b) comprises displaying information regarding members in the shared space.

8. The method of claim 7 wherein:
the method further comprises receiving from the collaboration system awareness information that indicates whether each member is on-line and available; and
the information regarding members in the shared space includes the awareness information.

9. The method of claim 5 wherein step (c) comprises, for each synchronized file in the folder-based file system, maintaining, within the shared space, a snapshot that contains sufficient information to allow a determination to be made whether that file has changed.

10. The method of claim 9 wherein step (d) further comprises in response to the notification, examining each file snapshot to determine which file has changed.

11. The method of claim 1 wherein step (c) comprises connecting the operating system to the collaborative system via a web services interface.

12. The method of claim 1 wherein step (e) comprises maintaining, within the shared space, a list of members who are in the shared folder.

13. The method of claim 12 wherein step (e) further comprises for each member who is in the shared folder, maintaining, within the shared space, information indicating whether that member has a copy of contents of at least one synchronized file in the shared folder.

14. The method of claim 13 further comprising providing a stub file to each shared folder member who does not have the contents of the at least one synchronized file.

15. The method of claim 1, further comprising, at a computing device of a user who is in the shared folder and does not have a copy of the contents of a synchronized file, displaying a stub file in a user interface.

16. The method of claim 15 further comprising downloading file contents from a source when a user selects the stub file display.

17. The method of claim 16 wherein the source comprises a server.

18. The method of claim 16 wherein the source comprises a computer of another member.

19. The method of claim 1 wherein step (e) comprises using the collaborative system to disseminate file changes to members in the shared folder.

20. The method of claim 19 wherein the file changes are disseminated as compressed representations of the file changes represented as binary differences.

21. The method of claim 5, further comprising, on a computer used by a receiving member of the members collaborating with the context of the shared folder, creating a copy of the shared space; and
wherein the method further comprises:
receiving a data change message;
forwarding the data change message to a document share engine in the shared space; and
using the document share engine to make the file change to a corresponding file in a folder-based file system on the computer used by the receiving member.

22. The method of claim 21 wherein using the document share engine comprises using a file synchronizer in the collaborative system that makes change specified in the data change message in the folder based file system under control of the document share engine.

23. The method of claim 1, wherein step (e) comprises using a document share engine within a shared space of the collaboration system to notify each of the plurality of members that the change has occurred.

24. The method of claim 23, further comprising:
using the document share engine to provide, for display in the collaborative interface, a list of the plurality of members and an indicator showing which of the plurality of members has opened a selected synchronized file.

25. The method of claim 1 wherein the collaborative interface comprises an on-line chat mechanism.

26. The method of claim 1 wherein the collaborative interface comprises a mechanism for creating and storing comments related to a selected file.

27. An apparatus at a first end point of a collaboration system for providing information and services that allows a plurality of members to interact collaboratively in a shared folder in a folder-based file system that is part of an operating system on a first computer, the apparatus comprising:
a processor;
means for displaying a collaborative interface, the collaborative interface providing a mechanism through which a user may select at least one file in the folder-based file system as a synchronized file;
an interface that connects the collaborative interface to the collaboration system in order to retrieve and display information from the collaboration system regarding the members in the user interface;
a file synchronizer that receives a notification from the operating system of a change made in the folder-based file system; and
a document share engine within the collaboration system on the first computer that:
communicates the change to the plurality of members of the collaboration system;
receives changes to the synchronized file from at least one of the plurality of members accessing the collaboration system on a second computer; and
applies the received change to a file in the folder-based file system on the first computer.

28. The apparatus of claim 27 wherein the means for displaying the collaborative interface is designed and implemented as a portion of a user interface of the operating system.

29. The apparatus of claim 27 wherein the means for displaying the collaborative interface comprises an enhancement of a user interface of the operating system to include the collaborative interface.

30. The apparatus of claim 27 wherein the means for displaying the collaborative interface comprises a replacement of a portion of a user interface of the operating system with an interface specifically intended to support collaborative activity.

31. The apparatus of claim 27 further comprising a web services interface that allows the collaborative interface to interact with the collaboration system to create a shared space.

32. The apparatus of claim 31 further comprising a web services interface that allows the collaborative interface to interact with the collaboration system to invite one of the plurality of members to join the shared space.

33. The apparatus of claim 32 wherein the collaborative interface comprises means for displaying information regarding the plurality of members in the shared space.

34. The apparatus of claim 33 wherein the information regarding members in the shared space includes awareness information obtained from the collaboration system that indicates whether each member is on-line and available.

35. The apparatus of claim 27 wherein the file synchronizer comprises means for maintaining for each of the at least one synchronized file in the folder-based file system in response to changes made by any of the plurality of members, a snapshot that contains sufficient information to allow a determination to be made whether the at least one synchronized file has changed.

36. The apparatus of claim 35 wherein the file synchronizer further comprises a file RAMP that receives a notification from the folder-based file system that the change has been made to the folder-based file system and means responsive to the notification for examining each file snapshot to determine which file has changed.

37. The apparatus of claim 27 wherein the file synchronizer comprises a web services interface that connects to the collaboration system.

38. The apparatus of claim 27 wherein the interface comprises a web services interface that allows the collaborative interface to interact with the collaboration system to create a shared space and wherein the document share engine comprises means for maintaining a list of members who are in the shared space.

39. The apparatus of claim 38 wherein the document share engine further comprises means for maintaining for each member who is in the shared space information indicating whether that member has contents of the at least one synchronized file in the shared space.

40. The apparatus of claim 39 further comprising means for creating a stub file and providing the stub file to each shared space member who does not have the contents of the at least one synchronized file.

41. The apparatus of claim 40 further comprising means for displaying the stub file in the user interface.

42. The apparatus of claim 41 further comprising means for downloading file contents from a source when a user selects the stub file display.

43. The apparatus of claim 42 wherein the source comprises a server.

44. The apparatus of claim 42 wherein the source comprises a computer of another member.

45. The apparatus of claim 27 wherein the document share engine comprises means for determining changes in the at least one file and means for providing that changes to the collaboration system so that the changes are distributed to members in the shared folder.

46. The apparatus of claim 45 wherein the document share engine provides the file changes to the collaboration system as binary differences.

47. The apparatus of claim 27 wherein:
the interface comprises a web services interface that allows the collaborative interface to interact with the collaboration system to create a shared space and wherein the document share engine is located in the shared space and the document share engine further comprises means for receiving a change made in the shared space to a file; and
the apparatus further comprises means for communicating the change to the file synchronizer.

48. The apparatus of claim 47 wherein the file synchronizer comprises means for making the change in the folder based file system.

49. The apparatus of claim 47 wherein the document share engine comprises means for notifying each of the plurality of members that a file change has occurred.

50. The apparatus of claim 47 further comprising means cooperating with the document share engine and comprising means for displaying in the collaborative interface a list of the plurality of members and an indicator showing which of the plurality of members has opened a selected synchronized file.

51. The apparatus of claim 27 further comprising an on-line chat mechanism in the document share engine controlled by the collaborative interface.

52. The apparatus of claim 27 further comprises means controlled by the collaborative interface for creating and storing comments related to a selected file.

53. A computer program product for providing information and services of a collaboration system that allows a plurality of members to interact collaboratively in a shared folder in a folder-based file system that is part of an operating system, the computer program product comprising a computer storage medium having computer readable program code thereon, including:
program code for presenting a collaborative interface through which a user may select at least one shared folder;
program code for using the collaborative interface to display information regarding the plurality of members collaborating within the context of the shared folder through the use of the collaborative system;

program code within the collaboration system for receiving from the operating system on a first computer an event notification indicating a change within the folder-based file system;

program code within the collaboration system for determining whether the change made in the folder-based file system relates to the at least one shared folder, the program code for determining comprises program code for maintaining a snapshot of at least one file in the shared folder;

program code for communicating the change to other members via the collaboration system;

program code for receiving an indication of a second change relating to the at least one shared folder from a member of the other members of the collaboration system accessing the collaboration system from a second computer; and program code for applying the second change to the folder-based file system on the first computer, whereby the shared folder is synchronized among the members of the collaboration system.

* * * * *